United States Patent [19]

Mitsuya et al.

[11] 4,205,341
[45] May 27, 1980

[54] PICTURE SIGNAL CODING APPARATUS

[75] Inventors: Eiji Mitsuya, Yokohama; Tomio Kishimoto, Yokosuka; Katsusuke Hoshida, Hoya; Naohiko Kamae, Tokyo, all of Japan

[73] Assignee: Nippon Telegraph and Telephone Public Corporation, Tokyo, Japan

[21] Appl. No.: 960,541

[22] Filed: Nov. 14, 1978

[30] Foreign Application Priority Data

Jan. 24, 1978 [JP] Japan ............................. 53-6388
Jan. 24, 1978 [JP] Japan ............................. 53-6389
Jan. 24, 1978 [JP] Japan ............................. 53-6390

[51] Int. Cl.² ............................................. H04N 7/12
[52] U.S. Cl. ................................... 358/135; 358/260; 358/282; 358/284; 358/287; 340/146.3 AG; 358/138
[58] Field of Search ............... 358/133, 135, 138, 260, 358/261, 283, 284, 282, 287; 340/146.3 AG; 364/515, 517

[56] References Cited

U.S. PATENT DOCUMENTS

| | | | |
|---|---|---|---|
| 3,462,547 | 8/1969 | Macovski | 358/133 |
| 3,582,887 | 6/1971 | Guthrie | 340/146.3 AG |
| 3,723,649 | 3/1973 | Pitegoff et al. | 358/282 |
| 3,737,854 | 6/1973 | Klemt | 340/146.3 AG |
| 3,869,698 | 3/1975 | Trost et al. | 340/146.3 AG |
| 3,973,239 | 8/1976 | Kakumoto et al. | 340/146.3 AG |
| 4,064,484 | 12/1977 | Mese et al. | 340/146.3 AG |

*Primary Examiner*—Howard W. Britton
*Assistant Examiner*—Edward L. Coles
*Attorney, Agent, or Firm*—Pollock, Vande Sande and Priddy

[57] ABSTRACT

A frame of a gray-scaled picture is divided into blocks, in each of which the mean luminance of picture elements is used as a threshold value for comparison with each picture element signal to classify it into 0 or 1 according to its magnitude to provide a resolution component. From the resolution component and each picture element signal in the block are calculated two gray components; the resolution component and the two gray components are used as coded outputs for each block. The size of each block is changed in accordance with the property of the picture in the portion corresponding to the block.

10 Claims, 29 Drawing Figures

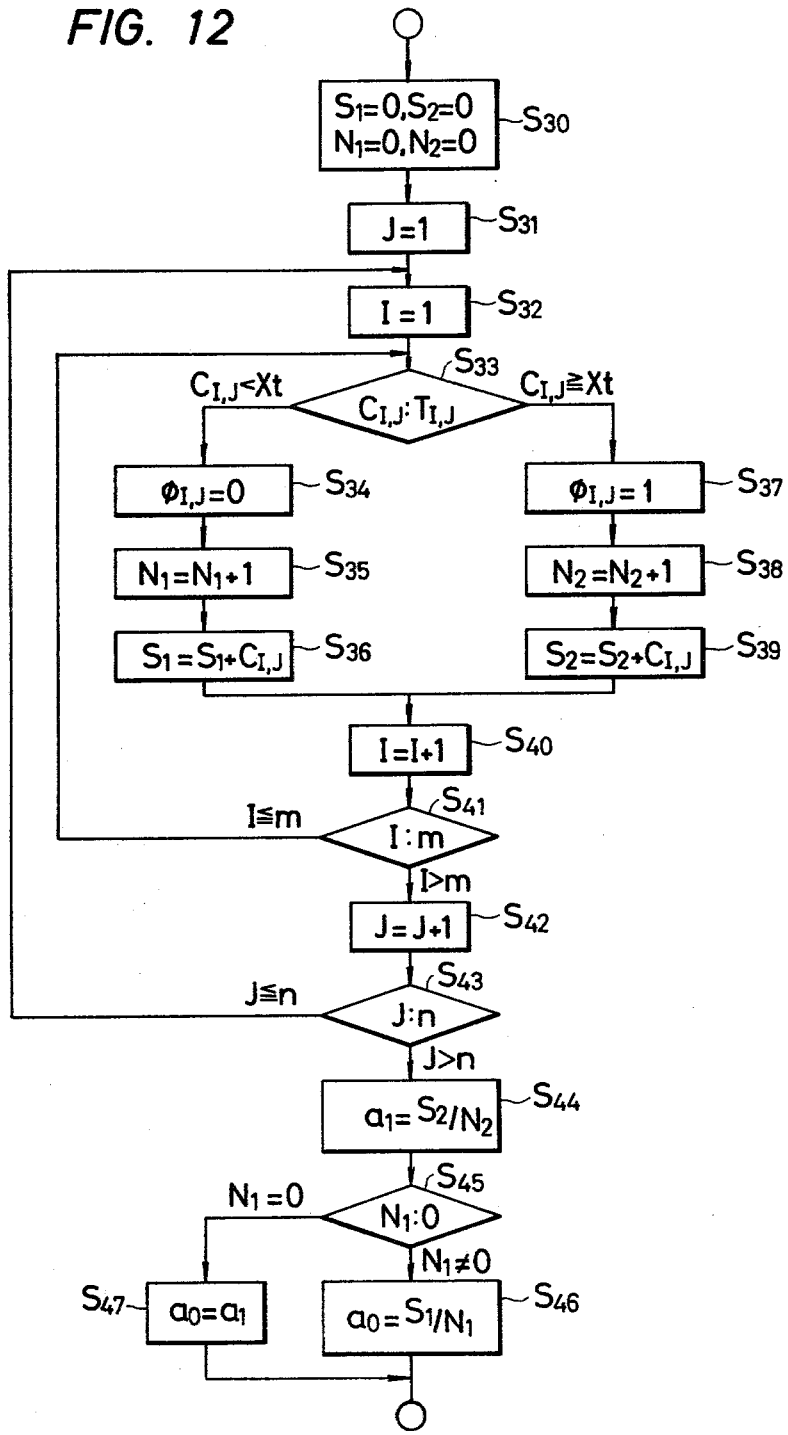

FIG. 14
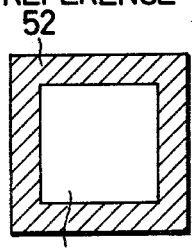
A
REFERENCE BLOCK
52
51
CODING BLOCK
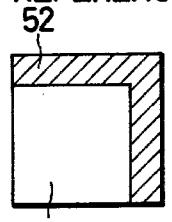
B
REFERENCE BLOCK
52
51
CODING BLOCK
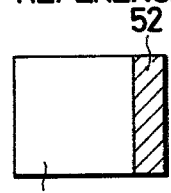
C
REFERENCE BLOCK
52
51
CODING BLOCK
FIG. 15
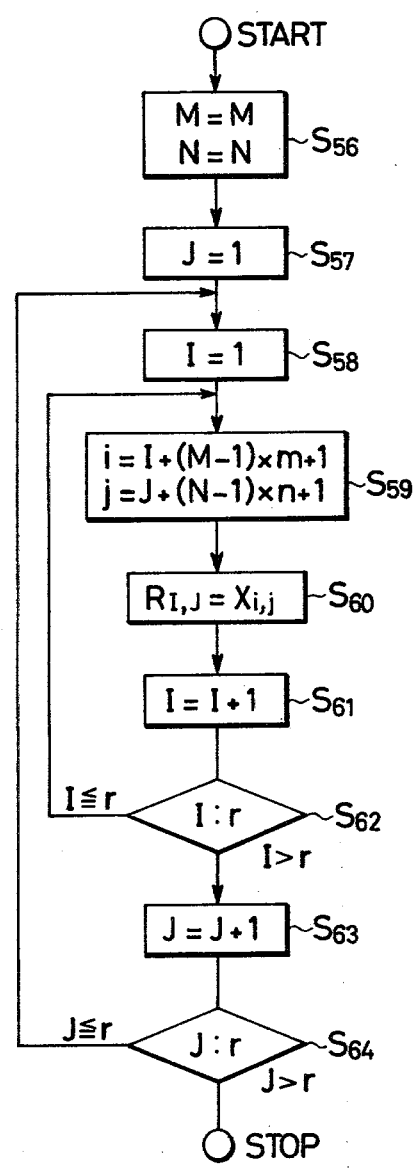

66 FIRST BLOCKS
67 SECOND BLOCKS
66 FIRST BLOCKS

PICTURE SIGNAL CODING APPARATUS

BACKGROUND OF THE INVENTION

This invention relates to a picture signal coding apparatus which is of particular utility when employed in the coding of still pictures.

For the reduction of the cost of picture signal transmission, there have heretofore been proposed DPCM, $\Delta$M and like coding systems, for example, in A. Habihi and G. S. Robinson "A Survey of Digital Picture Coding" Computer, 7,5, pp. 22–34 (May 1974). These known systems are called prediction coding systems, in which a prediction signal is produced based on a sample preceding a reference point and a prediction error signal which is a difference between a sample to be coded and the prediction signal is quantized for transmission. Due to the property of the picture signal, the prediction error signal occurs frequently in the range in which its amplitude is small, so that even if the prediction error signal is quantized roughly, the picture quality is not so much deteriorated; therefore the number of bits necessary for coding can be reduced as compared with that in ordinary PCM in which a sample is coded as it is.

With these conventional prediction coding systems, however, the prediction error signal must be transmitted every sample point, and the number of prediction error signal quantizing levels cannot be reduced extremely because of contributing factors to deterioration of the picture quality such as slope over load, granular noise, false contour, etc. For these reasons, the number of bits used is relatively large as a whole.

As a result of novelty search conducted by the European Patent Office, there was not found any particular prior literature corresponding to this invention but U.S. Pat. Nos. 3,403,226, 3,940,555 and 3,984,626 were cited as reference literatures. Now, a description will be given of U.S. Pat. No. 3,403,226 of the type in which a picture frame is divided into blocks. In this patent, one of picture elements is selected as a typical picture element for each block and coded by the PCM technique so that it can represent, by itself, its level, and the difference between the typical picture element and each of the other picture elements of the same block is coded into a PCM code.

Accordingly, though the number of quantizing levels for the latter PCM code is smaller than that for the typical picture element, transmission of the PCM codes requires a plurality of bits, resulting in an appreciably large number of bits being needed as a whole.

Some of the present inventors have proposed a picture signal coding apparatus of the type in which a frame of a gray-scaled picture is divided into a plurality of blocks; for each of the blocks, a threshold value is determined based on the luminance distribution in the block; each picture element signal of the block is compared with the threshold value to obtain a resolution component 1 or 0 according to the magnitude of the picture element; based on the resolution component and the picture element signals of the block, two typical luminance levels, that is, gray components, are determined; and the gray components and the resolution component are provided as coded outputs for the block. With such a method, two typical luminance levels are provided for each block and a 1-bit resolution component for each picture element; therefore the number of bits used in small as a whole and the picture can be reconstructed with excellent minuteness and tone wedge property. In this case, however, coding errors differ with blocks due to the property of the picture whose changes differ throughout its entire area of the frame. In other words, the coding errors are not distributed uniformly all over the reconstructed picture. Further, there is the possibility that the coding errors are centered on the areas near the borders of the blocks to make contours of the blocks noticeable in the reconstructed picture.

An object of this invention is to provide a picture signal coding apparatus which enables coding with less bits than those used in the prior art.

Another object of this invention is to provide a picture signal coding apparatus in which a picture frame is divided into blocks and then coded but the contour of each block is not noticeable in the reconstructed picture.

Still another object of this invention is to provide a picture signal coding apparatus in which a picture frame is divided into blocks but their sizes are each changed in accordance with the local property of the frame, thereby to enable coding with less bits.

SUMMARY OF THE INVENTION

According to this invention, a frame of a gray-scaled picture is divided into a plurality of blocks, and based on the statistical property of the luminance levels of picture elements in each block, the picture elements of the block are separated into gray components and resolution components, thereafter being coded. For instance, a threshold value is set in each block based on the luminance distribution therein, and the luminance level of each picture element is checked whether it is higher or lower than the threshold value. From the check results and the luminance levels of the picture elements are obtained two typical luminance levels. For each block, the two typical luminance levels and the check results are transmitted in the form of codes. Letting $a_0$ and $a_1$ represent the typical luminance levels, $x_t$ represent the threshold value, $x_i$ represent the luminance level of each picture element and $y_i$ represent the luminance level of the picture element after being converted by coding, decoding is achieved by the following conversion:

$$y_i = \phi_i \cdot a_0 + \overline{\phi_i} \cdot a_1$$

where when $x_i \geq x_t$, $\phi_i = 1$, where when $x_i < x_t$, $\phi_i = 0$, and where $\overline{\phi_i}$ is the complement of $\phi_i$. The typical luminance levels $a_0$ and $a_1$ are gray components, and $\phi_1$ is a resolution component.

The typical luminance levels $a_0$ and $a_1$ and the threshold value $x_t$ are determined, for example, in the following manner.

In accordance with a first method, a condition $\overline{x} = \overline{y}$ that means luminance levels $\overline{x}$ and $\overline{y}$ of the picture elements in each block remain unchanged before and after coding, is given, and the mean luminance level of the picture elements in each block before coding is used as the threshold value $x_t$, namely $x_t = \overline{x}$, and the following mean square errors before and after conversion in each block $$\epsilon^2 = \frac{1}{N_0} \sum_i^{N_0} (x_i - y_i)^2$$

are minimized, whereby to obtain the typical luminance levels $a_0$ and $a_1$ and the threshold value $x_t$. That is, letting $x_i$ represent the luminance level of each picture element in each block, $N_0$ represent the number of picture elements in the block, $\bar{x}$ represent the mean luminance level of the picture elements in the block, $\overline{x_L}$ represent the mean luminance level of the group of those picture elements whose luminance levels are lower than the mean luminance level $\bar{x}$, $N_1$ represent the number of such picture elements, $\overline{x_H}$ represent the mean luminance level of the group of those picture elements whose luminance levels are higher than the mean luminance level $\bar{x}$ and $N_2$ represent the number of such picture elements, the mean luminance levels $\bar{x}$, $\overline{x_L}$ and $\overline{x_H}$ are given as follows:

$$\bar{x} = \frac{\sum\limits_i^{N_0} x_i}{N_0}$$

$$\overline{x_L} = \frac{\underset{(x_i < \bar{x})}{\sum} x_i}{N_1}$$

$$\overline{x_H} = \frac{\underset{(x_i \geq \bar{x})}{\sum} x_i}{N_2}$$

obtaining the condition that the mean square error powers $\epsilon^2$ for the typical luminance levels $a_0$ and $a_1$ are minimized, namely, $(\partial/\partial a_0)\epsilon^2 = 0$ and $(\partial/\partial a_1)\epsilon^2 = 0$, the typical luminance levels $a_0$ and $a_1$ are given as follows:

$$a_0 = \overline{x_L}$$

$$a_1 = \overline{x_H}$$

This method is referred to as the two average value method.

A second method is to obtain the typical luminance levels $a_0$ and $a_1$ and the threshold value $x_t$ from the abovesaid condition $\bar{x} = \bar{y}$, a condition $\bar{x}^2 = \bar{y}^2$ that luminance powers $\bar{x}^2$ and $\bar{y}^2$ of the picture elements in the blocks before and after conversion remain unchanged before and after coding, and a condition $(\partial/\partial x_t)\epsilon^2 = 0$ that the mean error power becomes minimized in respect of the threshold value $x_t$. That is, letting $\overline{x_{L'}}$ represent the mean luminance level of the group of those picture elements whose luminance levels are lower than the threshold value, $N_1$ represent the number of such picture elements, $\overline{x_{H'}}$ represent the mean luminance level of the group of those picture elements whose luminance levels are higher than the threshold value, $N_2$ represent the number of such picture elements, $\bar{x}$ represent the mean luminance level of picture elements in each block before coding and $\delta^2$ represent variance of luminance levels of the picture elements, the mean luminance levels $\overline{x_{L'}}$, $\overline{x_{H'}}$ and variance $\delta^2$ are given a follows:

$$\overline{x_{L'}} = \frac{\underset{(x_i < x_t)}{\sum} x_i}{N_1}$$

$$\overline{x_{H'}} = \frac{\underset{(x_i \geq x_t)}{\sum} x_i}{N_2}$$

$$\delta^2 = \frac{1}{N_0} \sum\limits_i^{N_0} (x_i - \bar{x})^2$$

The threshold value $x_t$ is given as follows:

$$x_t = \tfrac{1}{2}(\overline{x_{L'}} + \overline{x_{H'}})$$

The typical luminance levels $a_0$ and $a_1$ are given as follows:

$$a_0 = \bar{x} - \sqrt{N_2}/N_1 \delta, \quad a_1 = \bar{x} + \sqrt{N_1}/N_2 \delta$$

This method is referred to as the variance method.

In the case of this method, if it were supposed that $x_t = \bar{x}$ so as to simplify the process of obtaining the threshold value $x_t$, the mean square error $\epsilon^2$ is not always minimized, but the typical luminance levels $a_0$ and $a_1$ are the same as those obtainable in the above.

A third method is to simultaneously satisfy the conditions $x = y$, $(\partial/\partial a_0)\epsilon^2 = 0$, $(\partial/\partial a_1)\epsilon^2 = 0$ and $(\partial/\partial x_t)\epsilon^2 = 0$ utilized in the first and second methods. In this instance, the threshold value $x_t$ is expressed as follows:

$$x_t = \tfrac{1}{2}(\overline{x_i} + \overline{x_H})$$

and the typical luminance levels $a_0$ and $a_1$ are as follows:

$$a_0 = \underset{x_i < x_t}{\sum} \frac{x_i}{N_1}$$

$$a_1 = \underset{x_i \geq x_t}{\sum} \frac{x_i}{N_2}$$

This method is referred to as the variable threshold method.

Thus, in this invention, there are transmitted the typical luminance levels $a_0$ and $a_1$ in each block and the resolution component indicative of the level $a_0$ or $a_1$ at which each picture element is to be decoded. In other words, for each picture element, information "1" or "0" is transmitted, and for each block, the typical luminance levels $a_0$ and $a_1$ of the block are transmitted. Accordingly, the number of bits used is markedly reduced as a whole, and in addition, since the picture frame is divided into blocks, excellent picture reconstruction can be achieved.

In this invention, the picture frame is divided into blocks, so the boundary of each block is likely to be noticeable. To avoid this, the luminance of the picture element on the outside of the block near the boundary thereof is taken into account in the determination of the threshold value $x_t$ near the boundary. Alternatively, the threshold value for determining whether the luminance of the picture elements near the boundary of the block are above or below is modified in accordance with the threshold value of the adjoining block.

For example, in the case where a luminance change is small in a particular portion of the picture, deterioration of the picture quality is relatively small even in a relatively large block; in such an instance, if the block is made large, the number of typical luminance levels is decreased by that and the number of bits can be reduced correspondingly. In such a portion where the picture greatly changes, even if the block is relatively small, the reconstructed picture quality is markedly degraded. Accordingly, it is preferred to change the size of each block in accordance with the property of the picture.

For example, a code conversion is carried out for a block of a predetermined size, and the absolute values of the differences between the luminance levels of the picture elements before and after the conversion, $\epsilon_i = |y_i - x_i|$, are added together for each block, and depending upon whether the sum is too small or large, the block is made large or small. It is also possible to add together the square values of the absolute value $\epsilon_i$ for each block and control the size of the block in accordance with the added value. Also, it is possible to make the block small or large in dependence upon whether the difference, $D = a_1 - a_0$, between the gray components $a_0$ and $a_1$ is large or small.

BRIEF DESCRIPTION OF THE DRAWINGS

FIG. 12 is a flowchart showing a resolution component discriminating routine and a typical luminance level calculating routine;

FIGS. 14A through 14C are diagrams showing the relationships between coded blocks and a reference block;

FIG. 15 is a flowchart showing a reference block read-in routine;

DESCRIPTION OF THE PREFERRED EMBODIMENTS

Figure 1:
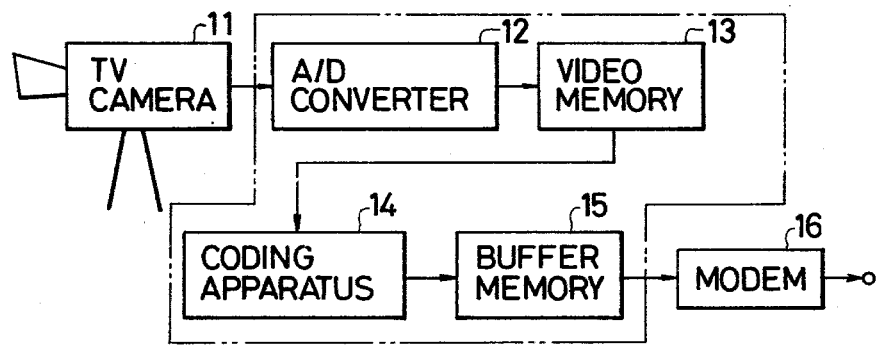
FIG. 1 is a block diagram illustrating an embodiment of the picture signal coding apparatus according to this invention.
Figure 2:
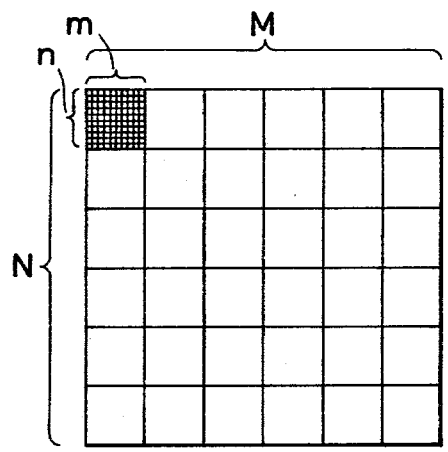
FIG. 2 is a diagram showing an example of a picture divided into blocks.

Referring now to FIG. 1, a picture signal picked up by a TV camera 11 is quantized by an analog-to-digital converter 12 for each picture element, thereafter being stored in a video memory 13. The picture picked up by the TV camera 11 is divided into, for instance, $N \times M$ blocks, as depicted in FIG. 2, and each block is composed of $n \times m$ picture elements. The picture signal stored in the video memory 13 is read in a coding apparatus 14 for each block.

Letting $x_i$ represent the luminance level of each picture element in the block, the luminance level $x_i$ is converted by the coding apparatus 14 to $y_i$ in the following process:

$$y_i = \phi_i a_1 + \overline{\phi_i} \cdot a_0$$

where when $x_i \geq x_t$, $\phi_i = 1$ and $\overline{\phi_i} = 0$ and when $x_i < x_t$, $\phi_i = 0$ and $\overline{\phi_i} = 1$. The values $x_t$, $a_0$ and $a_1$ are obtained from the distribution of luminance levels of the picture elements in the block by one of the three methods described previously. By the coding apparatus 14, picture information in the block is converted to gray components $a_0$ and $a_1$ and resolution components ($\phi_0, \phi_1, \ldots \phi_q$) ($q = m \times n$). These converted codes are stored in a buffer memory 15, from which they are read out thereof at a constant speed suitable to a transmission line and provided thereon via a modem 16.

Figure 3:
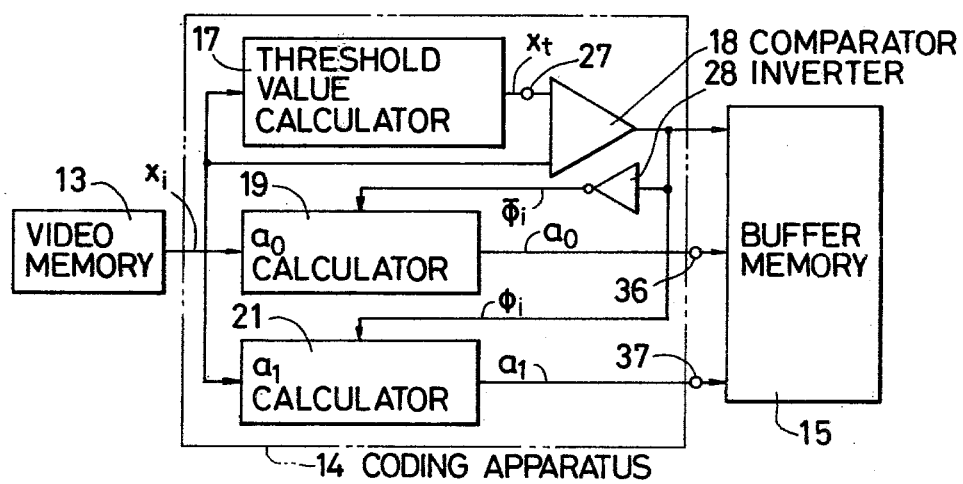
FIG. 3 is a block diagram illustrating an example of a coding apparatus 14 utilized in FIG. 1.
Figure 4:
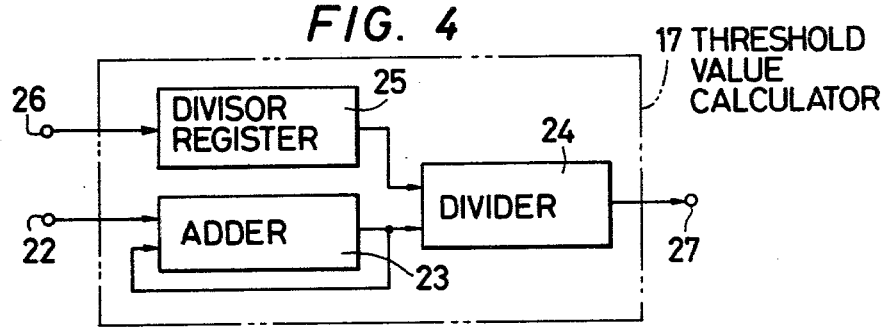
FIG. 4 is a block diagram showing an example of a threshold calculator 17 used in FIG. 3.

The coding apparatus 14 is constructed, for example, as illustrated in FIG. 3. The output from the video memory 13 is applied to a threshold value calculator 17, one input terminal of a comparator 18, an $a_0$ calculator 19 and an $a_1$ calculator 21, respectively. In the threshold value calculator 17, for example, as shown in FIG. 4, the picture element signals applied via a terminal 22 from the video memory 13 are sequentially accumulated in an adder 23, the initial value of which is reset at zero. Upon completion of addition of all the picture elements of the block, the output from the adder 23 is provided to a dividend input terminal of a divider 24, in which the input thereto is divided by a divisor stored in a divisor register 25. The value of the divisor is the number of all picture elements of the block $m \times n$, and is set by a signal at a terminal 25. In this manner, the mean luminance level value $\overline{x}$ of the picture elements in the block is derived as the threshold value $x_t$ at a terminal 27.

The threshold value $x_t$ thus obtained is applied to the other input terminal of the comparator 18 in FIG. 3. The comparator 18 compares the luminance level $x_i$ of each picture element with the threshold value $x_t$ to provide the resolution component ($\phi_i$) to the buffer memory 15. The compared output $\phi_i$ and its inverted output $\overline{\phi_i}$ from an inverter 28 are applied to the $a_1$ calculator 21 and the $a_0$ calculator 19, respectively, to obtain the gray components $a_0$ and $a_1$.

Figure 5:
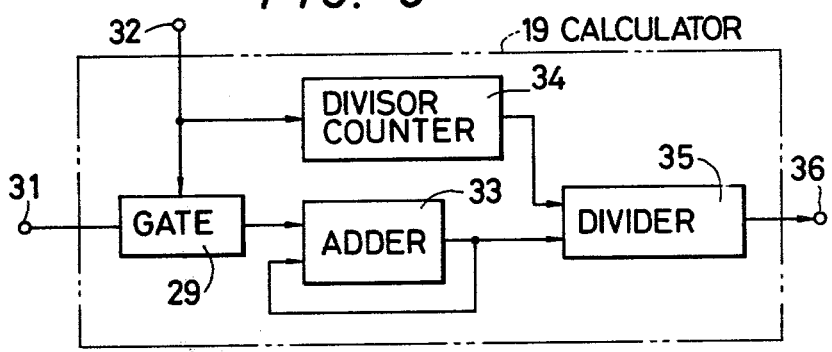
FIG. 5 is a block diagram showing an example of an $a_0$ calculator 19 utilized in FIG. 3.

In the $a_0$ calculator 19, for example, as depicted in FIG. 5, the picture element signals $x_i$ from the video memory 13 are supplied via a terminal 31 to a gate 29. The resolution component $\overline{\phi_i}$ from the inverter 28 is also applied as a control signal to the gate 29 via a terminal 32. The gate 29 is opened or closed depending upon whether the resolution component $\bar{\phi}_i$ is 1 or 0. Accordingly, in the case where $x_i < x_t$, namely, $\bar{\phi}_i = 1$, the picture element signals are accumulated in an adder 33 via the gate 29. Thus, all picture elements in the block that $x_i < x_t$ are added together in the adder 33.

The number of the gate control signals $\bar{\phi}_i$ at the terminal 32 in this case is counted by a divisor counter 34 to obtain the number $N_1$ of the picture elements that $x_i < x_t$ for each block. The divider 35 divides the added result $$\sum x_i \quad (x_i < x_t)$$

of the adder 33 by the picture element number $N_1$ stored in the divisor counter 34, providing the gray component $a_0$ at a terminal 36. The $a_1$ calculator 21 in FIG. 3 is identical in construction with the $a_0$ calculator 19 and produces the gray component $a_1$ at a terminal 37. The gray components $a_0$ and $a_1$ thus obtained are stored in the buffer memory 15 at suitable timings.

Figure 6:
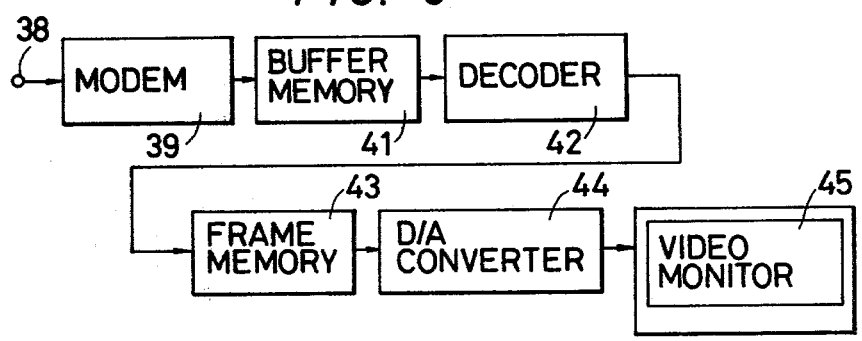
FIG. 6 is a block diagram illustrating an example of a decoding apparatus for decoding a coded signal from the coding apparatus of this invention.

The picture signal coded, as described above, is decoded in the following manner. For instance, as shown in FIG. 6, the coded picture signal applied via a terminal 38 from the transmission line is received and demodulated by a modem 39. The demodulated signal is once stored in a buffer memory 41 and then supplied to a decoder 42, in which each picture element signal is decoded, thereafter being written in a frame memory 43. The content of the frame memory 43 is read out thereof and converted by a digital-to-analog converter 44 to an analog signal, which is reconstructed by a video monitor 45 into a picture.

Figure 7:
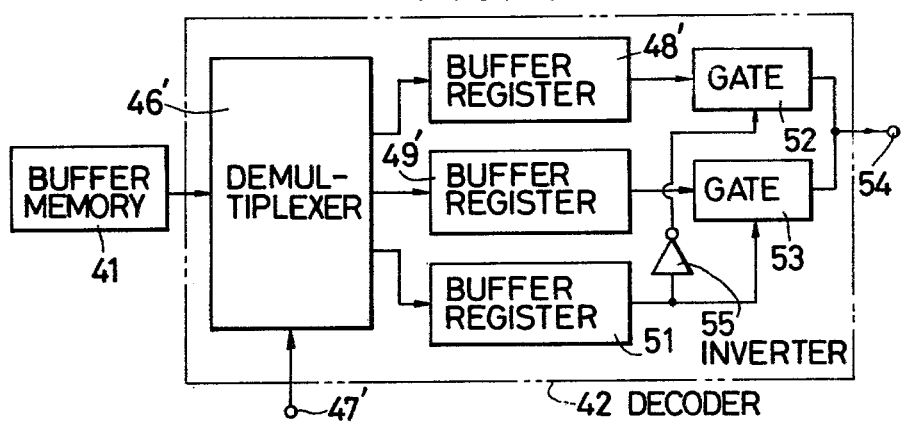
FIG. 7 is a block diagram showing an example of a decoder 42 used in FIG. 6.

The decoder 42 is constructed, as shown in FIG. 7. A demultiplexer 46' is controlled by a control signal from a terminal 47' to separate the signal from the buffer memory 41 into the gray components $a_0$ and $a_1$ and the resolution component $\phi_1$. The components $a_0$, $a_1$ and $\phi_i$ are transferred to buffer registers 48', 49' and 51, respectively. By the information $\phi_i$ from the buffer register 51, gates 52 and 53 are controlled to open or closed to permit the passage therethrough of either one of the information $a_0$ and $a_1$ stored in the buffer registers 48' and 49', providing at a terminal 54 the information as each picture element signal in the block. That is, when $\phi_i = 0$, i.e. $x_i < x_t$ on the transmitting side, the gate 52 is opened by the inverted output $\bar{\phi}_i$ from an inverter 55 to pass on the information $a_0$ in the buffer register 48' to the terminal 54, whereas when $\phi_i = 1$ and $x_i \geq x_t$ on the transmitting side, the gate 53 is opened by the information $\phi_i$ to pass on the information $a_1$ in the buffer register 49' to the terminal 54. Though not shown, since the position of each picture element in each block is known, the output at the terminal 54 is written in the frame memory 43 at an address corresponding to the above-said position. When the picture element signals of all blocks have thus been decoded and decoded information of one frame has been stored in the frame memory 43, a still picture of one frame is reconstructed on the video monitor 45.

Figure 8:
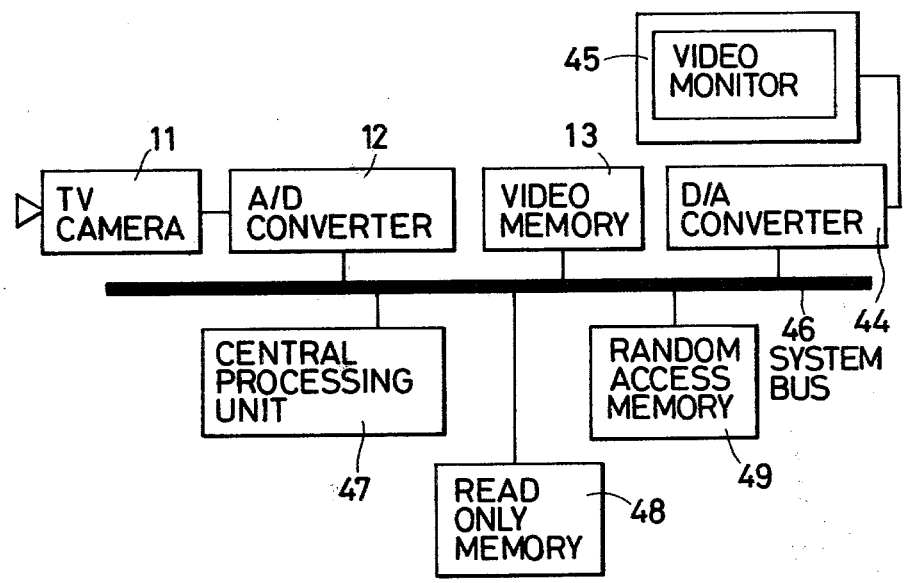
FIG. 8 is a block diagram showing another embodiment of coding apparatus of this invention which employs a microprocessor.

The coding and decoding described above can also be achieved by a stored program, using the so-called microcomputer. For example, as illustrated in FIG. 8, The output from the TV camera 11 is supplied to the analog-to-digital converter 12 for conversion into a digital signal, the output side of the analog-to-digital converter 12 being connected to a system bus 46. To the system bus 46 are also connected the video memory 13 and the digital-to-analog converter 44. Further, a central processing unit (CPU) 47, a read only memory (ROM) 48 and a random access memory (RAM) 49 are respectively connected to the system bus 46. The output side of the digital-to-analog converter 44 is connected to the video monitor 45.

The read only memory 48 stores therein a program for coding and decoding, and the central processing unit 47 sequentially reads out the program from the read only memory 48 and interprets and execute it, thereby to effect coding and decoding. The video memory 13 stores therein the output from the TV camera 11 in digital form or the decoded picture signal, and the stored content of the video memory 13 is read out thereof and converted by the digital-to-analog converter 44 to an analog signal for input to the video monitor 45. The random access memory 49 is utilized for temporarily storing data necessary for coding and decoding.

Figure 9:
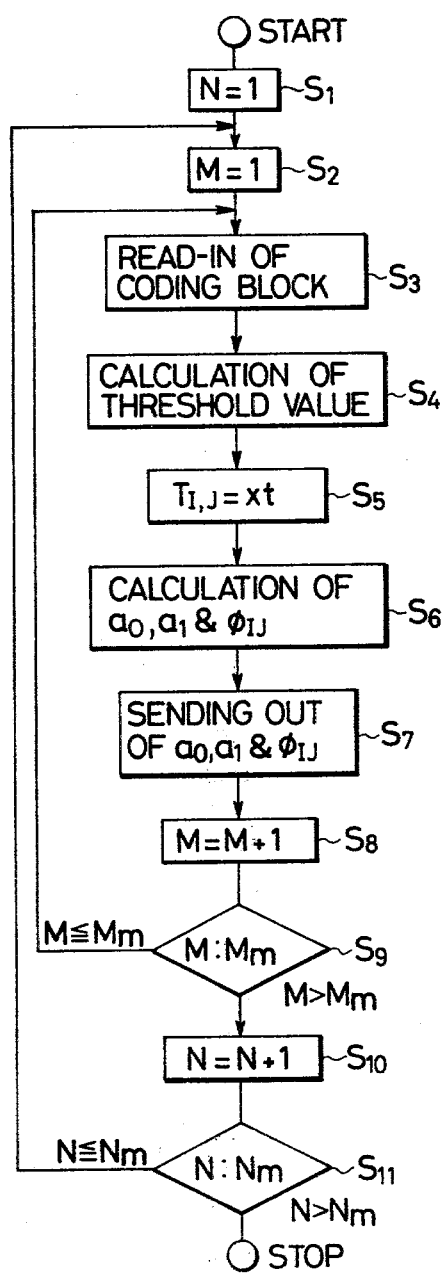
FIG. 9 is a flowchart showing the basic operations for coding.

A basic flowchart for coding is illustrated in FIG. 9. Upon starting, the content N of a row block memory is made 1 in a step $S_1$, and then the content M of a column block memory is made 1 in a step $S_2$. In a step $S_3$, picture element signals of the block designated by the contents N=1 and M=1 of the block memories are read in a temporary storage. Based on these picture element signals, the threshold value $x_t$ is calculated in a step $S_4$. In a step $S_5$, the threshold value $x_t$ is stored in a threshold memory corresponding to each picture element in the block. Next, in a step $S_6$, a resolution component $\phi_{IJ}$ is discriminated from each picture element signal $x_{IJ}$ and the threshold value $x_t$ corresponding thereto, and the gray components, that is, the typical luminance levels $a_0$ and $a_1$ are calculated. Each block is composed of picture elements of n rows and m columns, I=1, 2, ... m and J=1, 2, 3, ... n.

In a step $S_7$, the components $a_0$, $a_1$ and $\phi_{IJ}$ are transmitted, and then in a step $S_8$, the content M of the column block memory is added with 1. In the next step $S_9$, it is checked whether the memory content M has reached its maximum value Mm or not, and in the case where the content M is larger than the maximum value Mm, the content M of the row block memory is added with 1 in a step $S_{10}$. In a step $S_{11}$, it is checked whether the content N is in excess of its maximum value Nm, and if the content N is smaller than or equal to the maximum value Nm, the operation goes back to the step $S_2$. Where the content M of the column block memory is smaller than or equal to the maximum value Mn in the step $S_9$, the operation goes to the step $S_3$. When the content N is in excess of the maximum value Nm in the step $S_{11}$, it means completion of coding of the entire frame, and the operation is stopped.

Figure 10:
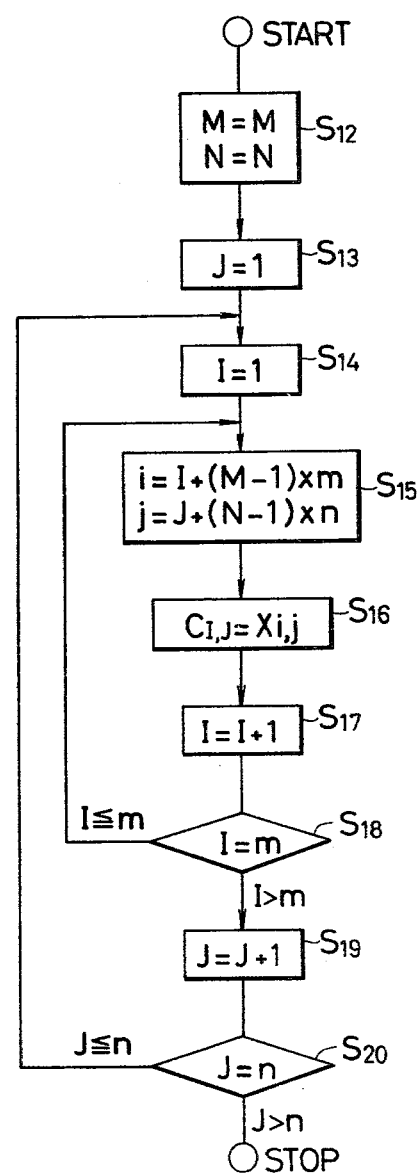
FIG. 10 is a flowchart showing a coded block read-in routine.

A coded block read-in routine in the step $S_3$ is shown, for example, in FIG. 10. At first, in a step $S_{12}$ the content M of the column block memory is set to M of block numbers M and N to be read in, and the content N of the row block memory is made N. The content J of a block row address memory which indicates that addresses J and I in the block is made 1 in a step $S_{13}$, and in a step $S_{14}$, the content I of a block column address memory is made 1. Next, in a step $S_{15}$, a calculation I+(M−1)xm of a frame row address i and a calculation J+(N−1)xn of a frame column address j are carried out. The luminance level $x_{ij}$ of picture element at the address (ij) is read out from the video memory 13 in a step $S_{16}$ and then transferred to the random access memory 49. Next, in a step $S_{17}$ the content I of the block column address memory is added with 1, and it is checked in a step $S_{18}$ whether the content I is smaller than, equal to or larger than m. Where $i \leq m$, the operation goes back to the step $S_{15}$, in which the luminance of the next picture element is read out and transferred. When $I > m$ in a step $S_{18}$, the content J of the block row address memory is added with 1 in a step $S_{19}$, and the result of the addition is checked in a step $S_{20}$. Where $J \leq n$, the operation goes back to the step $S_{14}$, whereas when $J > n$ the block read-in operation is completed. In this manner, the addresses of the picture elements in each block on the frame are sequentially designated, and the picture element signals are read in a temporary storage.

Figure 11:
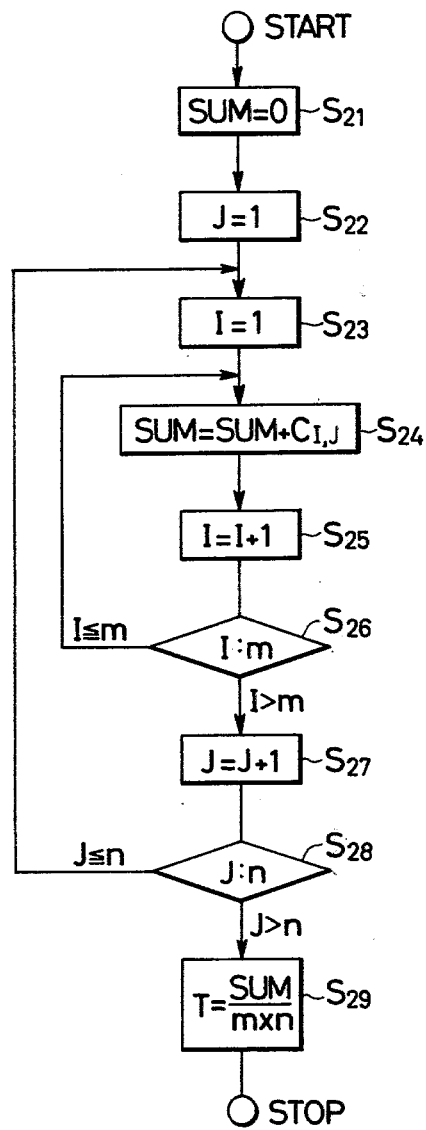
FIG. 11 is a flowchart showing a threshold value calculating routine.

A threshold value $x_t$ calculation routine in the step $S_4$ in FIG. 9 is illustrated in FIG. 11. This routine starts with making the content SUM of a summing memory zero in a step $S_{21}$. In the next step $S_{22}$, the content J of the block column address memory is made 1, and in a step $S_{23}$, the content I of the block row address memory is made 1. In a step $S_{24}$, the picture element signal $x_{IJ}$ designated by the contents I and J of the address memories is added to the content SUM of the summing memory and the added result is stored therein. Thereafter, in a step $S_{25}$, the content I of the block column address memory is added with 1 and the added result is checked in a step $S_{26}$. In the case of $I \leq m$, the operation goes back to the step $S_{24}$, in which luminance levels of the picture elements in the block are accumulated one after another. In the case of $I > m$, the operation proceeds to a step $S_{27}$, in which the content J of the block row address memory is added with 1, and the result of addition is checked in a step $S_{28}$. Where $J \leq n$, the operation goes back to the step $S_{23}$, whereas where $J > n$ the operation proceeds to a step $S_{29}$, in which the accumulated value SUM in the summing memory is divided by the number of picture elements in the block, $m \times n$, to obtain the threshold value $x_t$, which is stored in the threshold value memory.

In FIG. 12 is shown the calculation routine of the components $\phi_{IJ}$, $a_0$ and $a_1$ n the step $S_6$ in FIG. 9. At first, in a step $S_{30}$ contents $S_1$ and $S_2$ of first and second summing memories and contents $N_1$ and $N_2$ of first and second counter memories are respectively made zero. Then, in a step $S_{31}$ the content J of the block row address memory is made 1, and in a step $S_{32}$ the content I of the block column address memory is made 1. In a step $S_{33}$ the luminance $x_{IJ}$ of the picture element designated by the contents I and J of these address memories and the threshold value $x_t$ are compared with each other. In the case of $x_{IJ} < x_t$, the operation proceeds to a step $S_{34}$, in which the content $\phi_{IJ}$ of a resolution memory at the corresponding address is made 0, and in a step $S_{35}$ the content $N_1$ of the first counter memory is added with 1 and the picture element signal $x_{IJ}$ is accumulated to the content $S_1$ of the first summing memory. Where $x_{IJ} \leq x_t$ in the step $S_{33}$, the operation goes to a step $S_{37}$, in which the content $\phi_{IJ}$ of the resolution memory at the corresponding address is made 1, and in a step $S_{38}$ the content $N_2$ of the second counter memory is added with 1 and the content $S_2$ of the second summing memory is accumulatively added with $x_{IJ}$. The step $S_{36}$ or $S_{39}$ is followed by a step $S_{40}$, in which the content I of the block column address memory is added with 1, and the result of addition is checked in a step $S_{41}$. In the case of $I \leq m$, the operation goes back to the step $S_{33}$, in which the next picture element signal is compared with the threshold value. In the case of $I > m$, the operation goes to a step $S_{42}$, in which the content J of the block row address memory is added with 1. The result of addition is checked in a step $S_{43}$, and if $J \leq n$, the operation returns to the step $S_{32}$, and if $J > n$, the content $S_2$ of the second summing memory is divided by the content $N_2$ of the second counter memory to obtain the typical luminance level $a_1$ in a step $S_{44}$. Next, in a step $S_{45}$ the content $N_1$ of the first counter memory is checked, and when the content $N_1$ is not zero, the content $S_1$ of the first summing memory is divided by the content $N_1$ of the first counter memory to obtain the typical luminance level $a_0$ in a step $S_{46}$. If $N_1 = 0$ in the step $S_{45}$, the typical luminance level $a_0$ is made equal to $a_1$.

Figure 13:
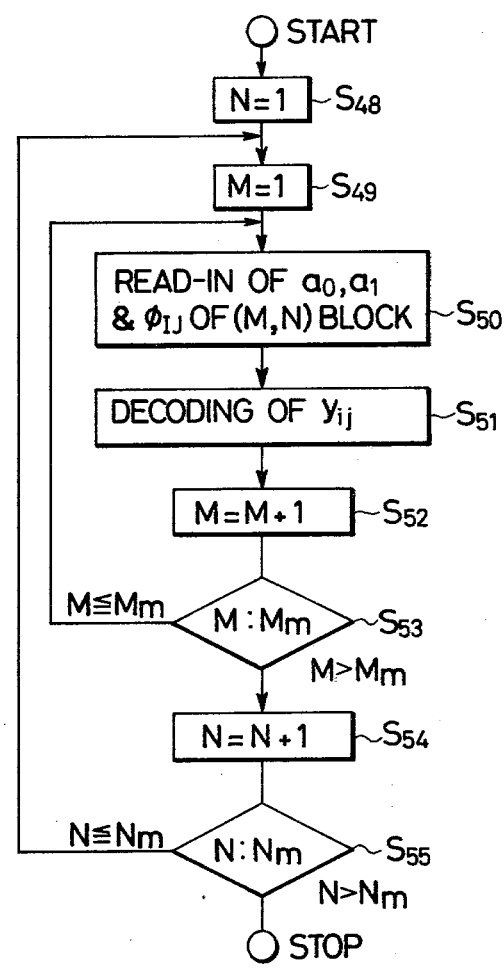
FIG. 13 is a flowchart showing the basic operations for decoding.

Turning next to FIG. 13, the decoding operation will be described. Let it be assumed that the video memory 13 in FIG. 8 has stored therein the components $a_0$, $a_1$ and $\phi_{IJ}$ of one frame. At first, in a step $S_{48}$ the content N of the row block memory is made 1, and in a step $S_{49}$ the content M of the column block memory is made 1. Then, based on the contents M and N of these block memories, the components $a_0$, $a_1$ and $\phi_{IJ}$ of each picture element in the block are read in the random access memory 49 in a step $S_{50}$. Next, in a step $S_{51}$ the components $a_0$ and $a_1$ are written as an output $y_{IJ}$ in the video memory 13 at the corresponding address depending upon whether the component $\phi_{IJ}$ is 0 or 1. In the next step $S_{52}$, the content M of the column block memory is added with 1 and its result is checked in a step $S_{53}$. Where $M \leq Mn$, the operation goes back to the step $S_{50}$, in which a code of the next block is read in a temporary storage. Where $M > Mn$, the content N of the row block memory is added with 1 in a step $S_{54}$. Then, the content N is checked, and if $N \leq Nm$, the operation goes back to the step $S_{49}$, and if $N > Nm$, it means completion of decoding of all picture elements and the decoding operation is stopped.

The decoding operation may also be achieved in the following manner: At first, a picture element address (ij) on the frame is determined, the components $a_0$, $a_1$ and $\phi_{ij}$ of the block to which the address (ij) belong are read out of the video memory 15, decoding of $y_{ij} = \overline{\phi_{ij}} a_0 + \phi_{ij} a_1$ is effected and the decoded output $y_{ij}$ is written in the video memory 15 at the address (ij); such a decoded output is similarly obtained in connection with each of the other addresses.

With the coding apparatus described above, it is possible to obtain a reconstructed picture with a small number of bits and excellent resolution. Especially, the threshold value $x_t$ and the typical luminance levels $a_0$ and $a_1$ are so set as to minimize the code conversion error between the picture elements in each block, so that a reconstructed picture can be obtained which is very excellent as compared with the portion of the original picture corresponding to the block. In some cases, however, there is the possibility that conversion errors are centered on the borders of blocks, allowing their contours to appear in the reconstructed picture.

The borders of the blocks can be made unnoticed in the reconstructed picture by the following method. That is, consider a block whose picture elements are to be coded (which block will hereinafter be referred to as the coding block) and a reference block which includes the coded block and is larger than it; for example, a coding block 51 having $8 \times 8$ picture elements and a reference block 52 which is larger than the coding block 51 by two picture elements on all four sides and is therefore composed of 12×12 picture elements, as shown in FIG. 14A. The reference block 52 may be such as shown in FIG. 14B in which it is larger than the coding block 52 on its two adjacent sides by two picture elements and hence is composed of 10×10 picture elements. Further, the reference block 52 may also be such as shown in FIG. 14C in which it is larger than the coding block 52 on its one side by two picture elements and hence is composed of 8×10 picture elements.

In the coding of the picture elements of the coding block, the mean luminance level of the reference block 52 is used as the threshold value $x_t$. And for the coding block 51, the resolution component $\phi_i$ and the typical luminance levels $a_0$ and $a_1$ are obtained in the same manner as described previously.

In the case of coding the picture elements of the coding block 51 by a stored program, the reference block 52 is read in a temporary storage by the routine depicted in FIG. 15. In this example, the reference block 52 bears the relationship shown in FIG. 14A to the coding block 51, and has a size of r×r, where r=n+2. In a step $S_{56}$, the contents M and N of the column and row block memories are respectively read out thereof, and in a step $S_{57}$ the content J of the block row address memory is made 1, and then in a step $S_{58}$ the content I of the blow column address is made 1. In a step $S_{59}$ calculations, $I+(M-1)\times m-1$ and $J+(N-1)+n-1$, of the row address j and the column address i are achieved. In a step $S_{60}$ the luminance $x_{ij}$ of the picture element in the frame address ij is read out of the video memory 13. In a step $S_{61}$ the content I of the block column address memory is added with 1, and the added result is checked in a step $S_{62}$. Where $I \leq r$, the operationn goes back to the step $S_{59}$, in which the next address is calculated. Where $I > r$, the operation proceeds to a step $S_{63}$, in which the content J of the block row address memory is added with 1. The result of this addition is checked in a step $S_{64}$, and if $J \leq r$, the operation goes back to the step $S_{58}$, whereas if $J > r$, then the coding operation is stopped. In this way, the luminance of each picture element in the reference block for the coding block, assigned by the contents N and M of the row and column block memories, is read in the temporary storage, and the threshold value $x_t$ is calculated by the same method as that shown in FIG. 11. By using the threshold value $x_t$ thus obtained, the components $\phi_{IJ}$ and $a_0$ and $a_1$ are calculated for the coding block in the manner shown in FIG. 12. By using the threshold value of the reference block as described above, it is possible to prevent the coding errors from being centered on the border of the coding block.

Regarding picture elements of a block adjoining the coding block, a threshold value change between the both blocks can be modified by reference to the threshold value of the adjoining block so that the change may be gradual in the picture frame. For example, in the case where the threshold value of a coding block (M,N) composed of 8×8 picture elements is $x_t(M,N)$ and the threshold value of a coding block (M+1,N) adjacent the block (M,N) is $x_t(M+1,N)$, as shown in FIG. 16A, the threshold value of a picture element column 54 of the block (M,N) third from a border line 53 between the blocks is made $x_t(M,N)$, the threshold value of a picture element column 55 of the block (M+1,N) third from the border line 53 is made $x_t(M+1,N)$, these threshold values are joined together by a straight line 56 and values $x_{t1}$ and $x_{t2}$ on the line 56 at those positions corresponding to picture element columns 57 and 58 of the block (M,N) second and first from the border line 53 are used as threshold values of these picture element columns, as illustrated in FIG. 16B. In a similar manner, the threshold values for picture elements of picture element columns 59 and 60 of the block (M+1,N) first and second from the border line 53 are made $x_{t3}$ and $x_{t4}$, respectively. The typical luminance levels are $a_{0'}$ and $a_{1'}$ in the block (M+1,N).

Figure 16:
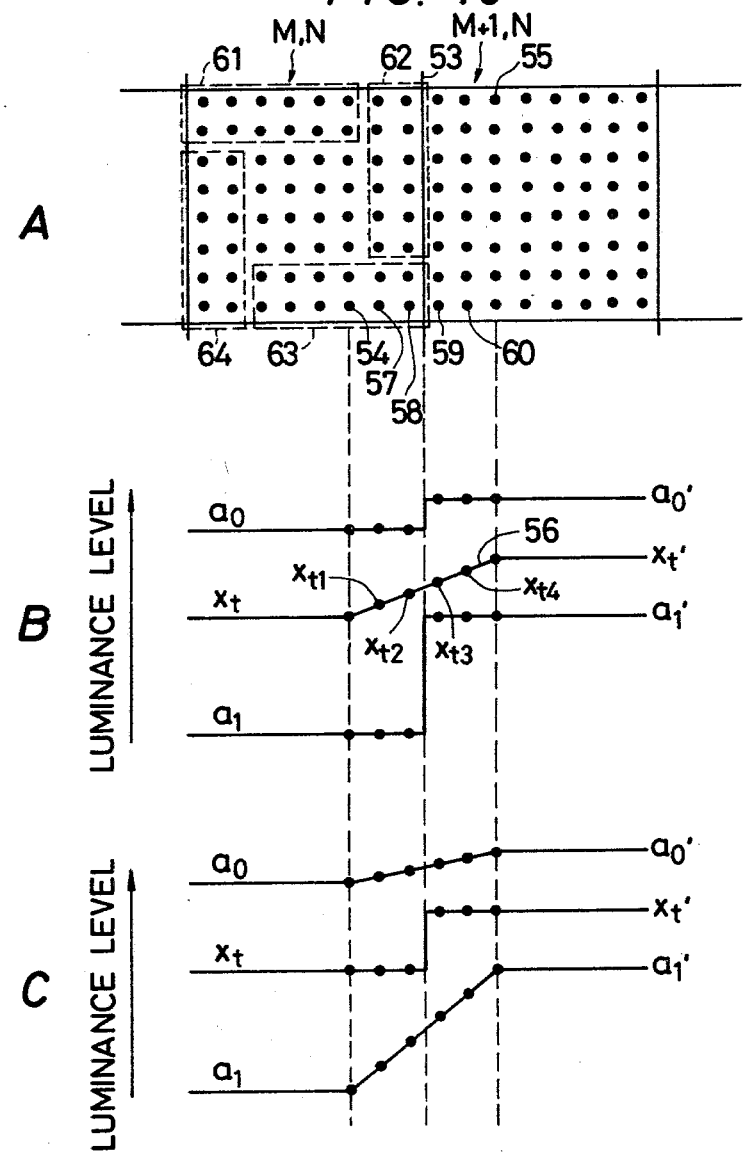
FIGS. 16A through 16C are diagrams showing the relationships of a picture element on the block boundary and a modified threshold value to a corrected typical luminance level.
Figure 17:
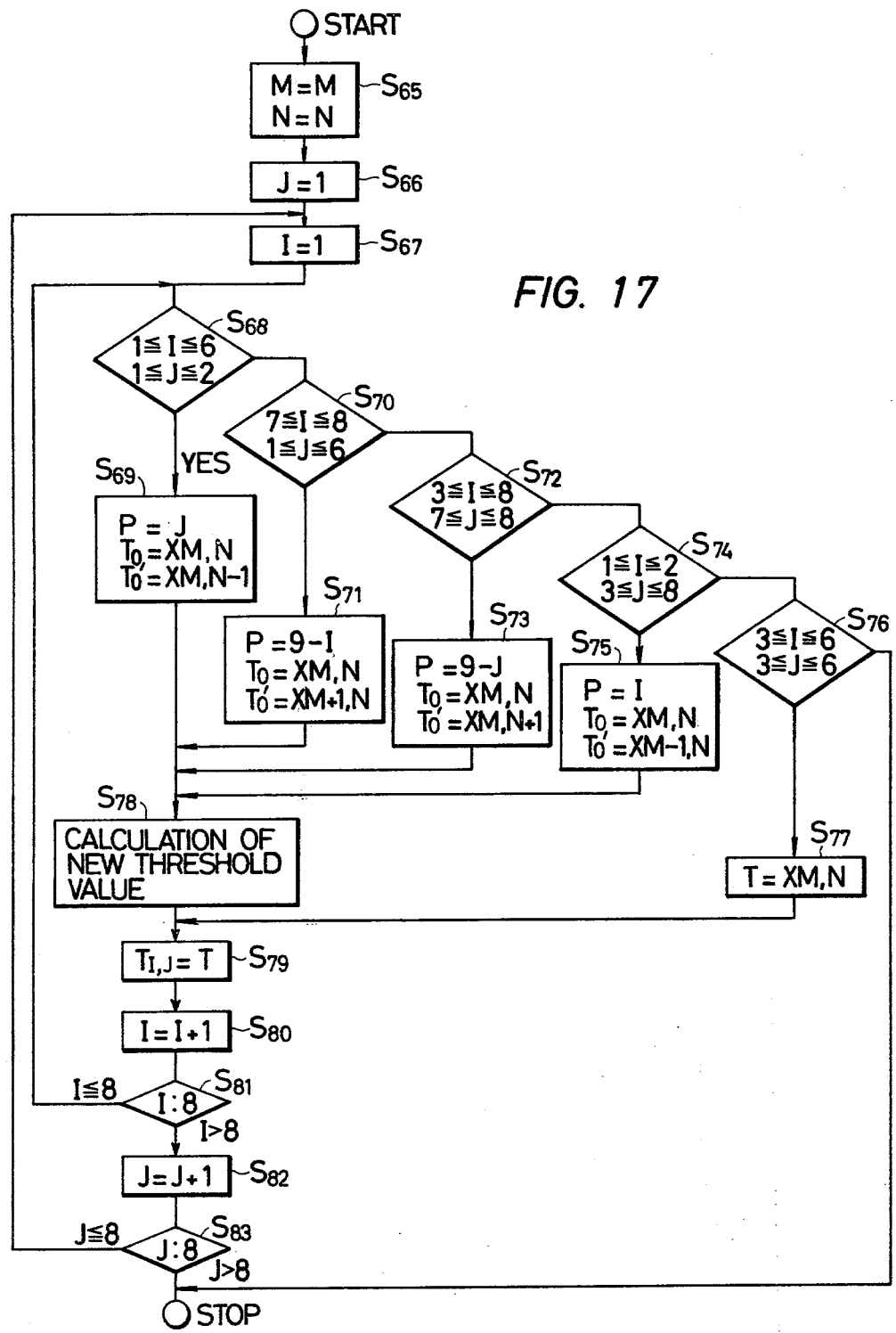
FIG. 17 is a flowchart showing a threshold modifying routine.

A routine for such threshold value modification is shown in FIG. 17. In a step $S_{65}$ the contents of the column and row block memories are set to M and N, respectively, in accordance with the coding block (M,N). In a step $S_{66}$ the content J of the block row address memory is made 1, and in a step $S_{67}$ the content I of the block column address memory is made 1. In a step $S_{68}$ the contents of these block address memories are checked, and in the case of $1 \geq I \leq 6$ and $1 \leq J \leq 2$, that is, in the case of the picture element to be coded lying in a region 61 in FIG. 16A, the operation proceeds to a step $S_{69}$, and in the other cases, the operation goes to a step $S_{70}$. In the step $S_{69}$ the content J of the block row address memory, the threshold value $x_{t(M,N)}$ of the block (M,N) and the threshold value $x_{t(M,N-1)}$ of the adjoining block (M,N−1) are respectively stored in an address register P, a threshold value register $T_0$ and a threshold value register $T_0'$. In the step $S_{70}$ it is checked whether $7 \leq I \leq 8$ and $1 \leq J \leq 6$ or not, that is, whether the picture element to be coded is in a region 62 or not, and in the case of the picture element lying in the region 62, the operation proceeds to a step $S_{71}$, in which the memory content 9-I, the threshold value $x_{t(M,N)}$ and the threshold value $x_{t(M+1,N)}$ of the adjoining block (M+1,N) are respectively stored in the address register P, the threshold value register $T_0$ and the threshold value register $T_0'$. If the picture element to be coded is outside of the region 62 in the step $S_{70}$, the operation goes to a step $S_{72}$, in which it is checked whether $3 \leq I \leq 8$ and $7 \leq J \leq 8$ or not, that is, whether or not the picture element to be coded lies in a region 63 in FIG. 16A. In the event that the picture element lies in the region 63, 9-J is stored in the address register and the threshold values $x_{t(M,N)}$ of the block (M,N) and $x_{t(M,N+1)}$ of the adjoining block (M,N+1) are respectively stored in the threshold value registers $T_0$ and $T_0'$. In a step $S_{73}$, if it is detected that the picture element to be coded is outside of the region 63, the operation proceeds to a step $S_{74}$, in which it is checked whether $1 \leq I \leq 2$ and $3 \leq J \leq 8$, that is, whether or not the picture element is present in a region 64 in FIG. 16A, and if so, the content I of the block column address memory is stored in the address register P and the threshold values $x_{t(M,N)}$ and $x_{t(M-1,N)}$ of the blocks (M,N) and (M−1,N) are respectively stored in the threshold value registers $T_0$ and $T_0'$. In the step $S_{74}$, if it is detected whether the picture element to be coded is not in the region 64, the operation proceeds to a step $S_{76}$, in which it is checked whether $3 \leq I \leq 6$ and $3 \leq J \leq 6$ or not, that is, whether or not the picture element to be coded lies in a non-modification region in the central portion of the block (M,N) in FIG. 16A. If so, then the operation proceeds to a step $S_{77}$, in which the threshold value $x_{t(M,N)}$ is stored in the threshold value register $T_0$. If not so, the address IJ is outside of the block (M,N), so that this routine comes to an end.

In a step $S_{78}$ a threshold value modifying calculation is executed based on the content P of the address register P and the contents $x_t$ and $x_t'$ of the threshold value register $T_0$ and $T_0'$ stored in the steps $S_{69}$, $S_{71}$, $S_{73}$ and $S_{75}$, respectively. This calculation is, for example, as follows:

$$\frac{(3-P) \times x_i' + (2+P) \times x_t}{5}$$

This modified threshold value or the threshold value which need not be modified in the step $S_{77}$ is stored in the threshold value memory at an address $T_{IJ}$ corresponding to the address of each picture element in a step $S_{79}$. Next, in a step $S_{80}$ the content I of the block column address memory is added with 1, and in a step $S_{81}$ the content I is checked; if $I \leq 8$, the operation goes back to the step $S_{68}$ to achieve the threshold value correction for the next picture element. If $I \leq 8$, the content J of the block row address memory is added with 1, and the content J is checked in a step $S_{83}$. Where $J \leq 8$, the operation goes back to the step $S_{67}$, and where $J \leq 8$, the threshold value correction for each picture element of the block (M,N) is completed.

Figure 18:
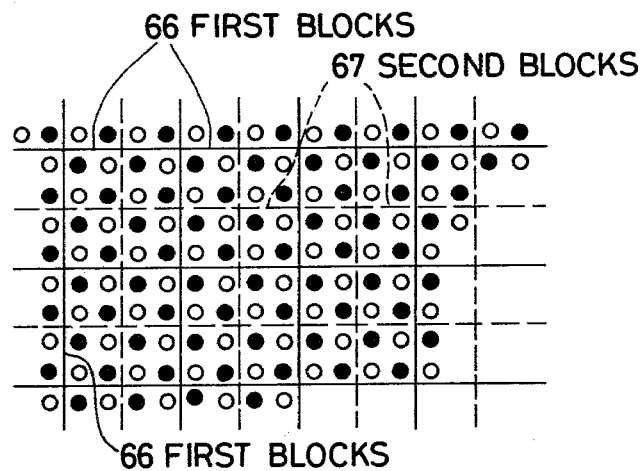
FIG. 18 is a block showing the relationship between first and second blocks.

The coding errors can also be prevented by the following method from being centered on the border of the block. For example, as shown in FIG. 18, the picture frame is divided into first blocks 66, each composed of $8 \times 8$ picture elements, as indicated by the full lines, and second blocks 67, each similarly composed of $8 \times 8$ picture elements but displaced in the row and column directions by half pitch, as indicated by broken lines. One of adjacent one of the picture elements belongs to the first block 66, and the other belongs to the second block 67. In FIG. 18, those of the picture elements which belong to odd rows and columns and even rows and columns, as indicated by black circles, belong to the first block 66, and the other remaining picture elements indicated by white circles belong to the second block 67. For each first block 66, similar coding is effected to obtain the resolution component $\phi_i$ and the gray components $a_0$ and $a_1$; also for each second block 67, the resolution component $\phi_i$ nd the gray components $a_0$ and $a_1$ are similarly obtained.

Figure 19:
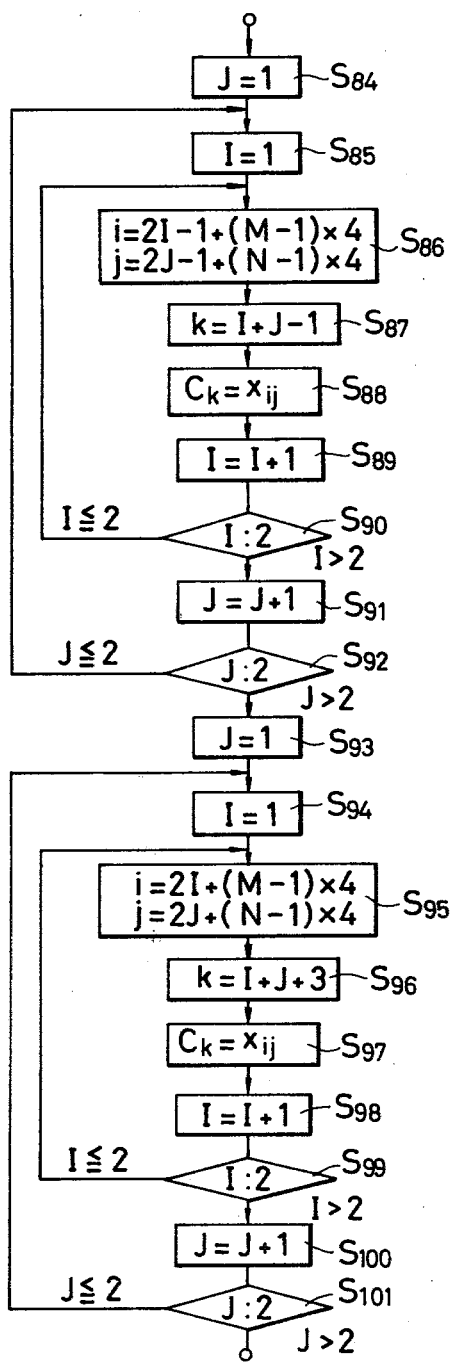
FIG. 19 is a block diagram showing a first block read-in routine.

For such coding, for example, the first blocks 66 are sequentially read in a temporary storage, and the picture elements of each block are coded by the same procedure as described previously, and then the second blocks 67 are successively read in a temporary storage, and the picture elements of each block are coded. A first block read-in routine is shown in FIG. 19 in connection with the example of FIG. 18. In a step $S_{84}$ the content J of the block row address memory is made 1, and in a step $S_{85}$ the content I of the block column address memory is made 1. In a step $S_{86}$ row and column addresses, $i=2I-1+(M-1)\times 4$ and $j=2J-1+(N-1)\times 4$, on the picture frame are calculated. In a step $S_{87}$ an address, $k=I+J-1$, in the buffer memory is calculated, and in a step $S_{88}$ the picture element $x_{ij}$ of the address ij is read out and written in the address k of the buffer memory. In a step $S_{89}$ the content I of the block column address memory is added with 1, and in a step $S_{90}$ the added result is checked. In the case of $I \leq 2$, the operation goes back to the step $S_{86}$, and in the case of $I>2$, the operation proceeds to a step $S_{91}$. In a step $S_{91}$ the content J of the block row address memory is added with 1, and the added result is checked in a step $S_{92}$. If $J \leq 2$, the operation goes back to a step $S_{85}$, and in the case of $J<2$, the operation proceeds to a step $S_{93}$, in which the content J of the block row address memory is made 1, and in a step $S_{94}$ the content I of the block column address memory is made 1. In a step $S_{95}$ addresses on the picture frame, $i=2I+(M-1)\times 4$ and $j=2J+(N-1)\times 4$, are calculated. In a step $S_{96}$ an address in the buffer memory, $k=I+J+3$, is calculated. In a step $S_{97}$ the picture element signal ij is stored in the address k of the buffer memory. In a step $S_{98}$ the content I of the block column address memory is added with 1, and in a step $S_{99}$ the added result is checked. Where $I \leq 2$, the operation goes back to the step $S_{95}$, and where $I>2$, the operation proceeds to a step $S_{100}$, in which the content J of the block row address is added with 1. The result of addition is checked in a step $S_{101}$, and in the case of $J \leq 2$, the operation goes back to the step $S_{94}$, and in the case of $J>2$, the operation comes to an end.

The routine for reading the second block 67 in a temporary storage is the same as the routine of FIG. 19 except that $i=2I-1+(M-1)\times 4 \times 2$ and $j=2J+(N-1)\times 4+2$ are calculated in the steps $S_{86}$ and $S_{95}$. The first and second blocks 66 and 67 need not always be displaced from each other by just half pitch, as shown in FIG. 18, and as long as they are merely displaced from each other, it is possible to obtain the effect of preventing the coding error from being centered on the border of the block.

The concentration of the coding errors on the border of the block can also be avoided by correcting the typical luminance levels $a_0$ and $a_1$ for the picture elements lying near the border of the block during decoding. This modification may be achieved in the same manner as in the case of modification of the threshold value described previously with respect to FIG. 16. That is, in the case where the typical luminance levels $a_0$ and $a_1$ of the block (M,N) and the typical luminance levels $a_0'$ and $a_1'$ of the adjoining block (M+1,N), levels intermediate between the typical luminance levels $a_0$ and $a_0'$ and levels intermediate between the typical luminance levels $a_1$ and $a_1'$, as indicated by black circles in FIG. 16C, are used respectively for the picture elements of the blocks (M,N) and (M+1,N) in the vicinity of the border line 53 therebetween. The calculation for correcting these luminance levels can be achieved in the same procedure as that described previously in respect of the threshold value correcting calculation in FIG. 17.

Figure 20:
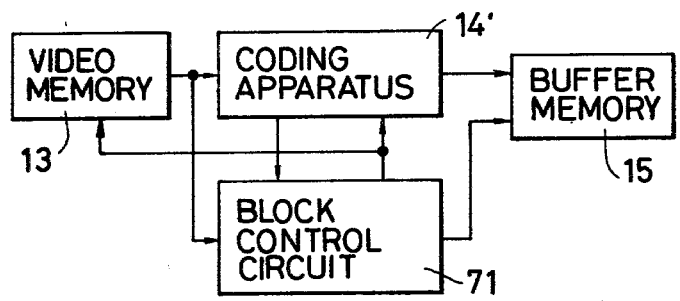
FIG. 20 is a block diagram illustrating an example of the case of controlling the size of a block in the apparatus of this invention.
Figure 21:
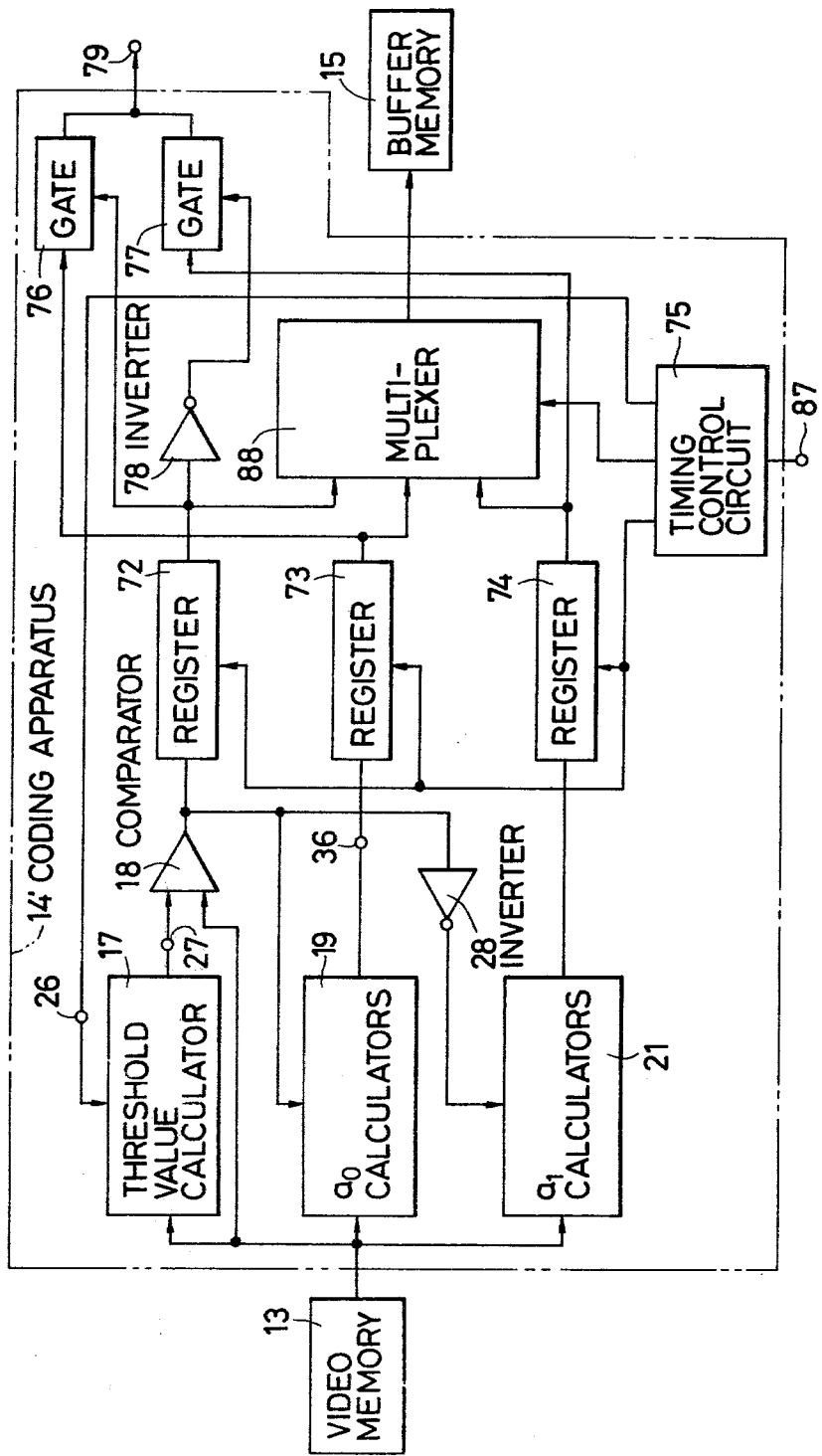
FIG. 21 is a block diagram showing an example of the coding apparatus of FIG. 20.

In the above, the picture frame is divided into blocks of the same size, but even if a portion of the frame where the picture changes slightly over a wide range is made a larger block, the reconstructed picture quality is not degraded. Conversely, if a portion of great picture changes is made a smaller block, the reconstructed picture quality can be enhanced. Accordingly, it is preferred to control the size of each block in accordance with the property of the picture in its particular region. An example of such control will be described with reference to FIG. 20. From the video memory 13, picture elements of one block are read in a coding apparatus 14' and coded in the same manner as described previously in respect of FIG. 3, thereby to obtain the typical luminance levels $a_0$ and $a_1$ and the resolution component $\phi_i$. These components are not immediately sent out but instead decoded by the coding apparatus 14' to provide the decoded signal $y_i$. The decoded signal $y_i$ is supplied to a block control circuit 71 to obtain the error $\epsilon_i$ between the original picture element signal $x_i$ and the decoded signal $y_i$, and the sum total of the squares $\epsilon_i^2$ of the error $\epsilon_i$ for all the picture elements of the block is obtained. In the event that the sum total is larger than a preset value, the block is made smaller and its picture element signals are read in the coding apparatus 14' and similarly coded and the coded output is decoded to obtain the error; this operation is repeatedly carried out until the sum total of the squares $\epsilon_i^2$ becomes smaller than the preset value. Where the sum total of $\epsilon_i^2$ has become smaller than the preset value, the coded output at that moment is provided to the buffer memory 15. The coding apparatus 14' is one that the coding apparatus 14 shown in FIG. 3 has the decoding function, as illustrated in FIG. 21. The resolution component $\phi_i$ from the comparator 18 and the gray components $a_0$ and $a_1$ from the $a_0$ and $a_1$ calculators 19 and 21 are respectively stored in registers 72, 73 and 74 under the control of a timing control circuit 75. The outputs $a_0$ and $a_1$ from the registers 73 and 74 are respectively provided to gates 76 and 77, which are controlled by the resolution component $\phi_i$ from the register 72. Where the resolution component $\phi_i$ is "1", the gate 76 is opened but the gate 77 is controlled via an inverter 78, and when the component $\phi_i$ is "0", the gate 77 is opened. The outputs from these gates are combined with each other and applied to a terminal 79 to provide there the decoded output $y_i$.

Figure 22:
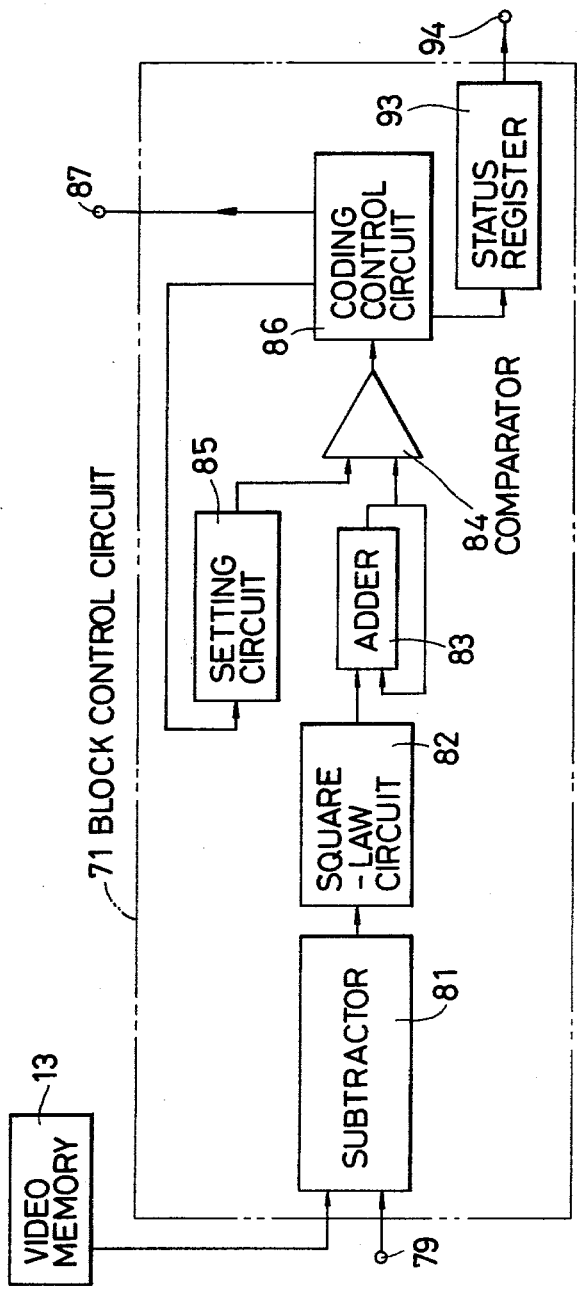
FIG. 22 is a block diagram showing an example of a block control circuit 71 used in FIG. 20.

In the block control circuit 71, as shown in FIG. 22, the original picture element signal $x_i$ and the decoded signal $y_i$, which occupy the same position in the block before and after the code conversion, are provided respectively from the video memory 13 and the terminal 79 to a subtractor 81 to obtain therein the difference between them, $\epsilon_i = y_i - x_i$. The difference output $\epsilon_i$ is squared by a square-law circuit 82. The squared output $\epsilon_i^2$ is applied to an adder 83 for accumulation. When the sum total $\epsilon_1^2$ of the squares $\epsilon_i^2$ for all the picture elements of one block has been obtained, the output from the adder 83 is applied to a comparator 84 for comparison with a preset value $T_8$ from a setting circuit 85 which is predetermined in the case of the block being composed of 8×8 picture elements. The comparator 84 produces an output $D_1 = 0$ or $D_1 = 1$ in dependence upon whether $\epsilon_1^2 < T_8$ or $\epsilon_1^2 \geq T_8$. Where $D_1 = 0$, a coding control circuit 86 provides via a terminal 87 to the timing control circuit 75 of FIG. 21 a command signal for transferring the contents of the registers 72, 73 and 74 of FIG. 21 as coded outputs to the buffer memory 15. Upon receiving the command signal, the timing control circuit 75 actuates a multiplexer 88 to successively transfer the resolution component $\phi_i$ and the gray components $a_0$ and $a_1$ from the registers 72, 73 and 74 to the buffer memory 15.

Figure 23:
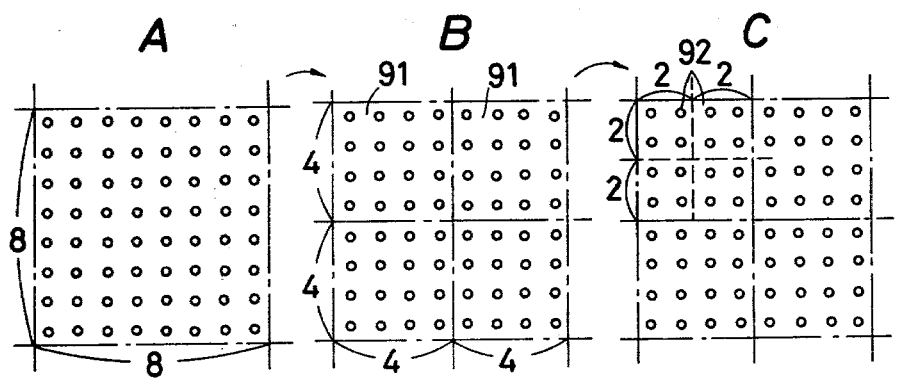
FIGS. 23A through 23C are diagrams showing the relationships among large, medium and small blocks.

In the case of $D_1 = 1$, the coding control circuit 86 applies to the timing control circuit 75 a command signal for decomposing the block and, at the same time, controls the setting circuit 85 to change its content to a preset value $T_4$ corresponding to the size of the block to be divided next. Until then, the picture element signals of the blocks each composed of 8×8 picture elements, as shown in FIG. 23A, have been read in, but, as depicted in FIG. 23B, the block is subdivided into four blocks 91, each composed of 4×4 picture elements, and for each block, picture element signals are read in a temporary storage and similarly coded and then decoded to obtain the decoded output $y_i$, which is compared with the original picture element signal $x_i$ to obtain the sum total $\epsilon_1^2$, ultimately detecting whether the comparator output $D_1$ is "0" or "1". In this case, since the number of picture elements in each block has changed to 4×4, the timing control circuit 75 applies a divisor change command to the threshold value calculator 17 via a terminal 27, whereby to change the set value of the divisor register 25 in FIG. 4 from 8×8 to 4×4. In the event that the comparator output $D_1$ is 0 as a result of coding of the block 91 composed of 4×4 picture elements, the coded output of the comparator output is sent out; in the case of the comparator output $D_1$ being 1, the block 91 is further subdivided into four blocks 92, each composed of 2×2 picture elements, as shown in FIG. 23C, and for each block 92, similar coding processing takes place to send out the coded output. In the block control circuit 71 of FIG. 22, coded block size information representative of the block size is set in a status register 93 from the coding control circuit 86, and when to send out the coded output to the buffer memory 15, if the block size is changed, information indicative of the new size is written in the buffer memory 15 via a terminal 94.

For decoding the coded signal that the block size is controlled, the information representative of the block size is extracted from received information and, based on the extracted information, an address is produced to effect the same decoding as shown in FIG. 7.

Figure 24:
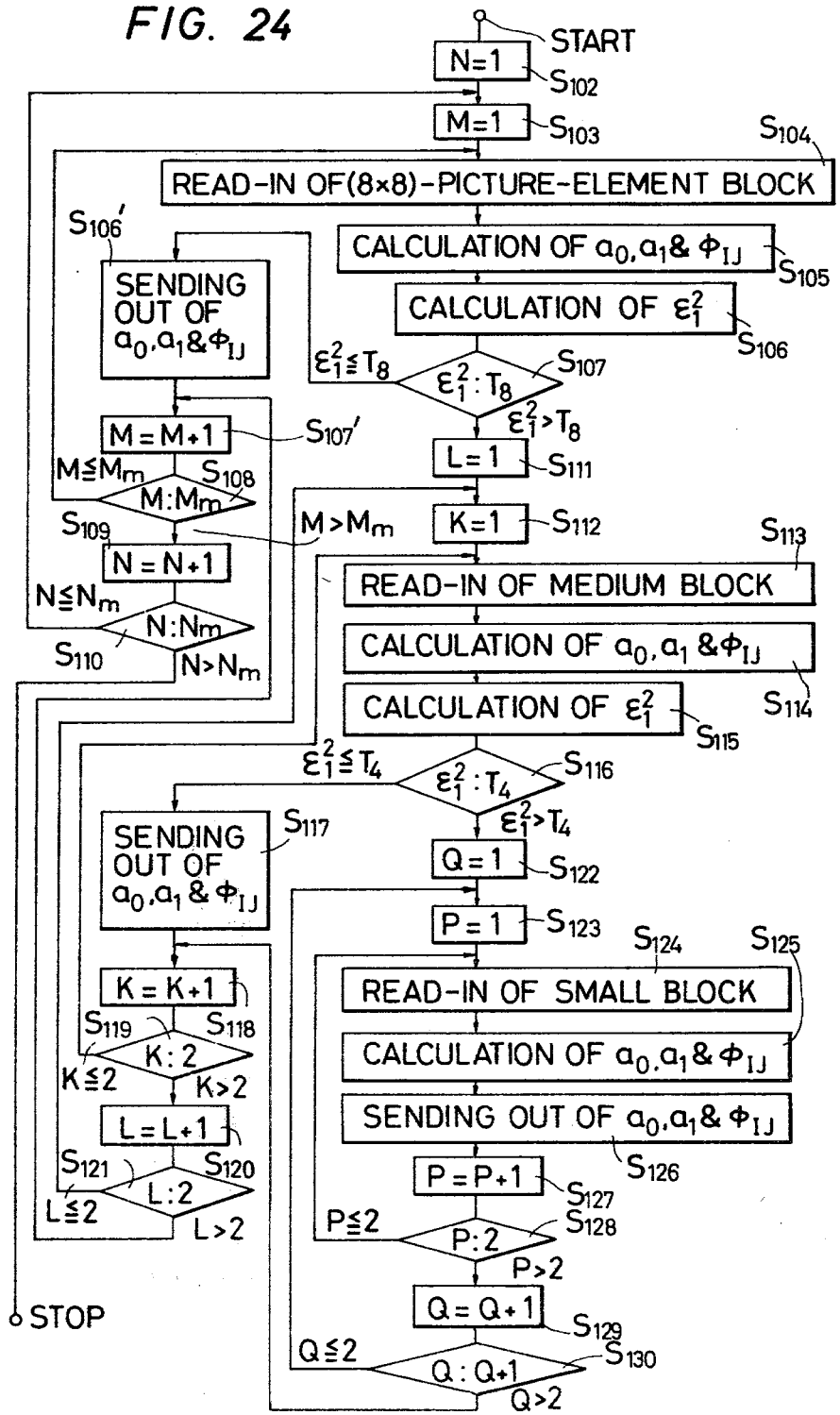
FIG. 24 is a flowchart showing a coding operation in the case of controlling the block size.

In FIG. 24 there is shown a flowchart for programmatically achieving the picture element coding while controlling the block size. In a step $S_{102}$ the content N of the block row memory is set to 1, and in a step $S_{103}$ the content M of the block column memory is set to 1. In a step $S_{104}$ the block composed of 8×8 picture elements is read in a temporary storage, and in a step $S_{105}$ the components $a_0$, $a_1$ and $\phi_{ij}$ are calculated for the block. The total sum $\epsilon_1^2$ of the squares of the error is calculated from the components $a_0$, $a_1$ and $\phi_{ij}$ in a step $S_{106}$ and compared with the preset value $T_8$ in a step $S_{107}$. Where $\epsilon_1^2 \leq T_8$, the components $a_0$, $a_1$ and $\phi_{ij}$ are sent out in the step $S_{106'}$, and in a step $S_{107'}$ the content M of the block column memory is added with 1, and then the content M is checked in a step $S_{108}$. If $M \leq Mm$, the operation goes back to the step $S_{104}$, whereas if $M > Mm$ the content N of the block row memory is added with 1. The content N is checked in a step $S_{110}$, and where $N \leq Mn$, the operation goes back to the step $S_{103}$, but when $N > Nm$, the operation comes to an end.

In the case of $\epsilon_1^2 > T_8$ in the step $S_{107}$, the content L of a medium block row memory is set to 1 in a step $S_{111}$, and in the step $S_{112}$ the content K of a medium block column memory is set to 1. In a step $S_{113}$ picture element signals of a medium block designated by $L = 1$ and $K = 1$ in the large block (M,N). In a step $S_{114}$ the components $a_0$, $a_1$ and $\phi_{ij}$ are calculated for the medium block, and in a step $S_{115}$ the aforesaid total sum $\epsilon_1^2$ is calculated based on the components $a_0$, $a_1$ and $\phi_{ij}$. The sum total $\epsilon_1^2$ thus obtained is compared with the preset value $T_4$ in a step $S_{116}$, and if $\epsilon_1^2 \leq T_4$, the components $a_0$, $a_1$ and $\phi_{ij}$ are sent out in a step $S_{117}$ and the content K of the medium block column memory is added with 1 in a step $S_{118}$, and the content K is checked in a step $S_{119}$. Where $K \leq 2$, the operation goes back to the step $S_{113}$, whereas when $K > 2$ the content L of the medium block row memory is added with 1 in a step $S_{120}$. Then, the content L is checked in a step $S_{121}$, and if $L \leq 2$, the operation goes back to the step $S_{112}$ and if $L > 2$, the operation goes to the step $S_{107'}$.

Where $\epsilon_1^2 > T_4$ in the step $S_{116}$, the operation proceeds to a step $S_{122}$, in which the content Q of a small block row memory is set to 1, and in a step $S_{123}$ the content P of a small block column memory is set to 1. In a step $S_{124}$ picture signals of a small block designated by $P = 1$ and $Q = 1$ in the medium block (K,L) included in the large block (M,N), are read in a temporary storage.

From the picture elements the components $a_0$, $a_1$ and $\phi_{ij}$ are calculated in a step $S_{125}$ and sent out in a step $S_{126}$. In a step $S_{127}$ the content P of the small block column memory is added with 1, and then the content P is checked in a step $S_{128}$. In this case, if $P \leq 2$, the operation goes back to the step $S_{124}$, and if $P > 2$, the operation proceeds to a step $S_{129}$, in which the content Q of the small block row memory is added with 1. The content Q is checked in a step $S_{130}$, and if $Q \leq 2$, the operation goes back to the step $S_{123}$, and if $Q > 2$, the operation goes to a step $S_{118}$.

Figure 25:
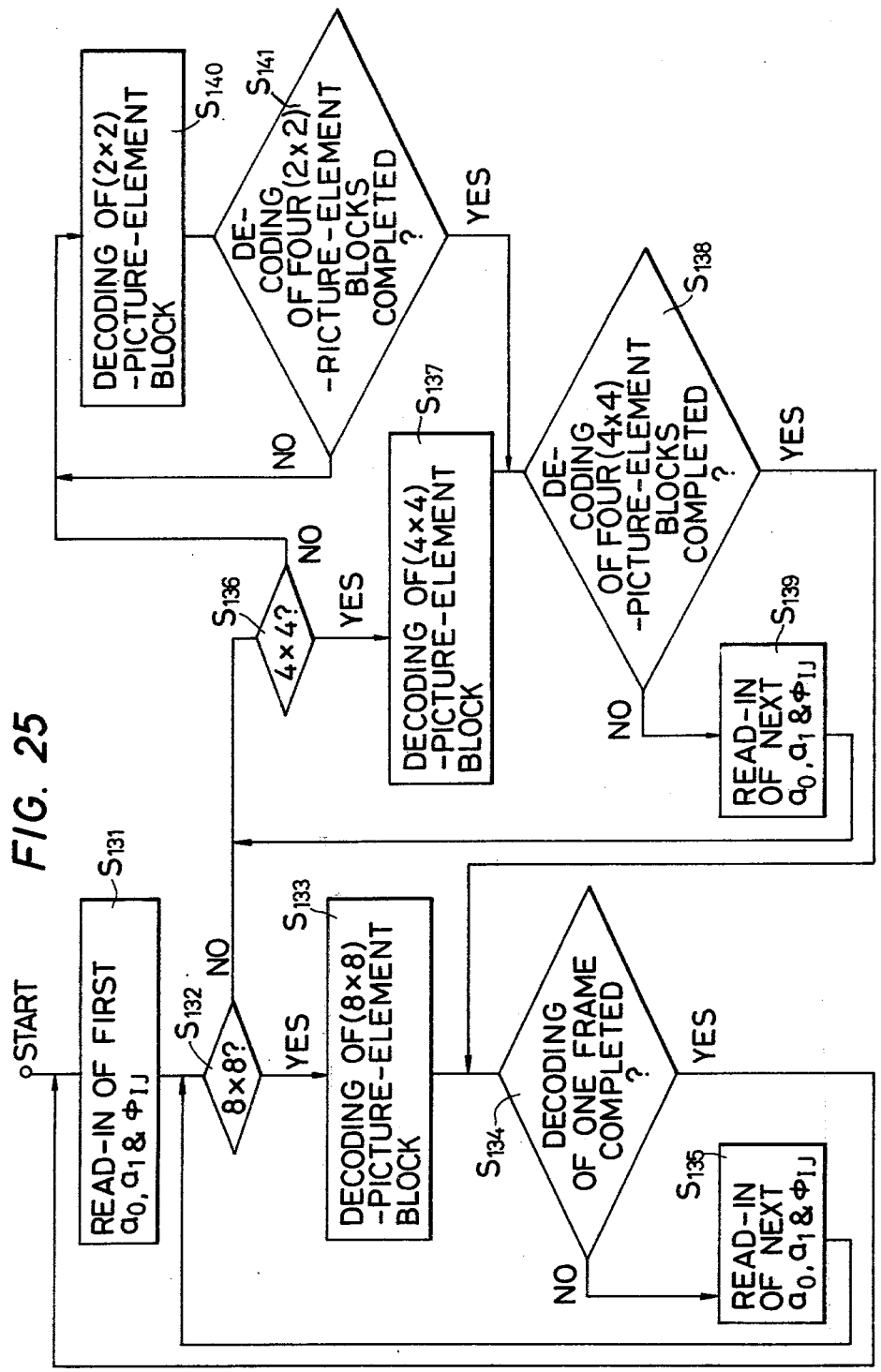
FIG. 25 is a flowchart showing a decoding operation in the case of controlling the block size.

In FIG. 25 there is shown a flowchart for decoding the signal coded, with the block size controlled. The decoding operation starts with a step $S_{131}$ in which the components $a_0$, $a_1$ and $\phi_{ij}$ of one block of the size corresponding to the block size information is read in a temporary storage, and in the next step $S_{132}$ it is checked whether or not the block size information is $8 \times 8$. In the case of YES, the read-in block is decoded in a step $S_{133}$, and in a step $S_{134}$ it is checked whether decoding of one frame has been completed or not. If not, the components $a_0$, $a_1$ and $\phi_{ij}$ of the next block composed of $8 \times 8$ picture elements are read in the temporary storage in a step $S_{135}$, and then the operation goes back to the step $S_{132}$. In the step $S_{132}$, if the block size is not $8 \times 8$, the operation goes to a step $S_{136}$ to check whether the block size information is $4 \times 4$ or not. In the case of YES, the block of the size $4 \times 4$ is decoded in a step $S_{137}$, and then in a step $S_{138}$ it is checked whether decoding of the four ($4 \times 4$)-picture-element block has been finished or not. If not, the components $a_0$, $a_1$ and $\phi_{ij}$ of the next ($4 \times 4$)-picture-element block are read in the temporary storage, and upon completion of successive decoding of the four ($4 \times 4$)-picture-element blocks in the step $S_{138}$, the operation goes back to the step $S_{134}$. In the case of NO in the step $S_{136}$, the operation goes to a step $S_{140}$ to effect decoding of the ($2 \times 2$)-picture-element block. In a step $S_{141}$ it is checked whether four ($2 \times 2$)-picture-element blocks have been decoded in succession or not. If not, the operation goes back to the step $S_{140}$, but if such decoding has been completed, the operation goes back to the step $S_{138}$.

As has been described in the foregoing, according to the picture signal coding apparatus of this invention, the picture frame is divided into a plurality of blocks and, for each block, at least two gray components and resolution components for each picture element are obtained, so that the minuteness and the tone wedge property of the picture are not impaired, and in addition, since a plurality of bits are not coded for each picture element, the number of bits used is small as a whole and the coding can be made highly efficient. Further, since the coding can be achieved by addition for each picture element or division for each block, the coding can be easily executed by a stored program, using a microprocessor, and the structure therefor can be made relatively simple as compared with that formed as a wired logic. As the resolution component is a binary signal and corresponds to each picture element, coding errors do not markedly degrade the picture quality. Decoding is achieved by controlling a gate circuit with the resolution component and the structure therefor can be formed easily.

Further, it is possible to avoid centering of the conversion errors on the border of the block by using, for each coding block, the threshold value of the reference block which overlaps and is larger than the coding block, or by correcting the threshold value in the vicinity of the border of the block with the threshold value of the adjoining block and dividing the picture frame into first and second block groups overlapping but displaced from each other to classify adjacent ones of the picture elements into the different block groups. Also, it is possible to make the blocks unnoticed in the reconstructed picture by forming the border line between adjacent ones of the blocks zigzag, though not described in the foregoing embodiment of the instant invention.

The coding efficiency can be further enhanced by changing the block size in accordance with the property of the picture in its particular portion.

In the foregoing, the blocks are each described to be square but may also be of a triangular, rhombic or like configuration. Moreover, the foregoing embodiment uses one threshold value and two typical luminance levels $a_0$ and $a_1$, but a plurality of threshold values may also be employed. In such a case, the picture element signals of one block are each classified into any one of a plurality of level ranges defined by the plurality of threshold values to obtain the resolution component $\phi_i$. Consequently, this resolution component $\phi_i$ is represented by a plurality of bits. From this resolution component $\phi_i$, each picture element signal and the threshold values, the typical luminance levels are calculated in the respective level ranges. In the foregoing embodiment, the mean value $\bar{x}$ of the picture element signals of each block is used as the threshold value $x_t$ and the typical luminance levels $a_0$ and $a_1$ are determined so that the sum total $\epsilon_1^2$ of the squares of the conversion errors $x_i - y_i$ in one block may be minimized in respect of the typical luminance levels $a_0$ and $a_1$ and that the mean values $\bar{x}$ and $\bar{y}$ of the picture element signals before and after the conversion may be equal to each other. However, it is also possible to determine the threshold value $x_t$ and the typical luminance levels $a_0$ and $a_1$ by the variance method or the variable threshold method, as referred to previously. In the foregoing embodiment, it is checked in the case of controlling the block size, whether or not the sum total $\epsilon_1^2$ of the squares of the errors $\epsilon_i$ of each picture element before and after conversion exceeds a preset value, but it is also possible to determine whether to change the block size based on the result of checking whether or not the sum total of absolute values of the errors $\epsilon_i$. Moreover, in the foregoing embodiment, a large block is changed to smaller ones, but it is also possible to change a small block to larger ones. The number of block sizes used in the foregoing is three but is not limited specifically thereto. The preset values $T_8$ and $T_4$ for determining whether to change the block size may also be fixed irrespective of the block size. Further, in the foregoing embodiment, when the block size is changed, larger and smaller blocks are made similar in configuration to each other, but the smaller block may also be one that its size is increased only in its lateral or vertical direction. At any rate, it is preferred that the size of the larger block is an odd multiple of the smaller block. Moreover, for a block of a slight luminance change, it is also possible to output only the mean value of the typical brightness levels $a_0$ and $a_1$, that is, only one typical gray level, instead of outputting the both typical luminance levels. The eyes do not sharply discriminate absolute brightness at a place of a large brightness change. In view of this, the number of bits quantizing the typical gray level may be reduced for a block of a large luminance level change. This will further reduce the number of bits used. Although this invention is suitable for the coding of still pictures, the invention is also applicable to the coding of moving pictures by effecting coding at a sufficiently high speed as compared with the speed of the moving picture.

It will be apparent that many modifications and variations may be effected without departing from the scope of the novel concepts of this invention.

What is claimed is:

1. A picture signal coding apparatus comprising:
   threshold value setting means for setting at least one threshold value for each of a plurality of coding blocks into which a frame of a gray-scaled picture is divided, based on the luminance distribution in each block;
   means for classifying the luminance level of each picture element of each coding block into any one of level ranges defined by the threshold value to obtain a resolution component;
   typical luminance level calculating means for obtaining at least two typical luminance levels from the classification result and the brightness levels of the picture elements of each coding block;
   decoding means for decoding the picture elements of each coding block based on the resolution component and the threshold value;
   error calculating means for a calculating a coding error in the coding of the coding block from each decoded picture element and its original picture element;
   block size changing means for comparing the calculated error with a set value to change the size of each coding block in accordance with the compared output; and
   means for providing, as true coded outputs, the resolution component and the typical luminance levels when the error is in a predetermined range.

2. A picture signal coding apparatus according to claim 1, wherein said block size changing means changes the size of the coding block to a smaller size when the error is larger than the set value.

3. A picture signal coding apparatus according to claim 1, wherein two coding blocks before and after conversion are selected so that the size of one of the two blocks is an integral multiple of the size of the other.

4. A picture signal coding apparatus according to claim 2, wherein the resolution component is composed of one bit for each picture element, wherein the number of typical luminance levels used is two, and wherein said decoding means outputs one of the two typical brightness levels with one of logical values of the resolution component and the other typical brightness level with the other logical value.

5. A picture signal coding apparatus according to claim 1, wherein said threshold value setting means sets the threshold value based on the luminance distribution of a reference block including said each coding block and larger than it.

6. A picture signal coding apparatus according to claim 1, which further includes threshold value correcting means for selecting the threshold value for picture elements near the border of said each coding block to be intermediate between the threshold value and that of the adjoining block.

7. A picture signal coding apparatus according to claim 1, wherein the frame is further divided into other coding blocks respectively displaced from the coding blocks to make one of adjacent ones of the picture elements belong to one of the coding blocks and the other belong to one of the other coding blocks, and wherein the both coding blocks are coded independently of each other.

8. A picture signal coding apparatus according to claim 1, wherein said threshold value setting means sets one threshold value, wherein the resolution component is information composed of one bit for each picture element, and wherein the number of typical brightness levels used is two.

9. A picture signal coding apparatus according to claim 9, wherein said threshold value setting means obtains a mean value of the luminance levels of the picture elements of each block, and wherein said typical luminance level calculating means calculate mean values $a_0$ and $a_1$ of the luminance levels of the picture elements below and above the threshold value.

10. A picture signal coding apparatus according to claim 1, wherein said threshold value setting means, said resolution component obtaining means and said typical luminance level calculating means are formed with a common microprocessor.

* * * * *